(12) United States Patent
Jo et al.

(10) Patent No.: US 9,712,988 B2
(45) Date of Patent: Jul. 18, 2017

(54) MOBILE COMMUNICATION TERMINAL, AND SYSTEM AND METHOD FOR SAFETY SERVICE USING SAME

(71) Applicant: THINKWARE CORPORATION, Seongnam-si, Gyeonggi-do (KR)

(72) Inventors: Yongrae Jo, Seoul (KR); Junghwa Yoo, Seoul (KR); Jihyun Yoo, Seoul (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 15/267,901

(22) Filed: Sep. 16, 2016

(65) Prior Publication Data

US 2017/0006450 A1 Jan. 5, 2017

Related U.S. Application Data

(63) Continuation of application No. 13/876,906, filed as application No. PCT/KR2011/007214 on Sep. 30, 2011, now Pat. No. 9,462,445.

(30) Foreign Application Priority Data

Sep. 30, 2010 (KR) ........................ 10-2010-0095186

(51) Int. Cl.
| | | |
|---|---|---|
| *H04M 9/00* | (2006.01) | |
| *H04W 4/22* | (2009.01) | |
| *H04N 7/18* | (2006.01) | |
| *H04N 1/00* | (2006.01) | |
| *G06K 9/62* | (2006.01) | |
| *H04N 5/232* | (2006.01) | |
| *H04W 4/02* | (2009.01) | |

(52) U.S. Cl.
CPC ............ *H04W 4/22* (2013.01); *G06K 9/6201* (2013.01); *H04N 1/00307* (2013.01); *H04N 5/23206* (2013.01); *H04N 5/23296* (2013.01); *H04N 7/183* (2013.01); *H04N 7/185* (2013.01); *H04W 4/025* (2013.01); *H04W 4/021* (2013.01)

(58) Field of Classification Search
USPC ..... 455/404.2, 466; 348/239, 14.02; 463/31, 463/42
See application file for complete search history.

(56) References Cited

U.S. PATENT DOCUMENTS

| | | | | |
|---|---|---|---|---|
| 2004/0263609 A1* | 12/2004 | Otsuki | ................... | H04N 5/232 348/14.02 |
| 2010/0321534 A1* | 12/2010 | Kim | ..................... | G06T 7/0083 348/239 |
| 2012/0003956 A1* | 1/2012 | Austin | .............. | H04M 1/72538 455/404.2 |
| 2012/0115615 A1* | 5/2012 | Counts | .................... | A63F 13/12 463/42 |
| 2012/0122570 A1* | 5/2012 | Baronoff | ............... | A63F 13/216 463/31 |
| 2012/0244891 A1* | 9/2012 | Appleton | ............. | G06Q 10/107 455/466 |

* cited by examiner

*Primary Examiner* — David Q Nguyen
(74) *Attorney, Agent, or Firm* — Novick, Kim & Lee, PLLC; Sang Ho Lee

(57) ABSTRACT

The present invention provides a mobile communication terminal and a system and method for safety service using the terminal for checking the user's location and a situation of the surroundings of the user at the time of an emergency such as kidnapping, accident, and so on.

19 Claims, 34 Drawing Sheets

(a)  (b)

MOBILE COMMUNICATION TERMINAL, AND SYSTEM AND METHOD FOR SAFETY SERVICE USING SAME

CROSS-REFERENCE TO RELATED APPLICATIONS

The instant application is a continuation application of U.S. patent application Ser. No. 13/876,906 filed on Mar. 29, 2013, which is a national-stage application of PCT international application PCT/KR2011/007214 filed on Sep. 30, 2011, and claims priority under 35 USC §119 to Korean patent application 10-2010-0095186 filed on Sep. 30, 2010, the entire contents of which are hereby incorporated by reference.

TECHNICAL FIELD

The present invention relates to a mobile communication terminal, and a system and method for safety service using the same.

BACKGROUND ART

With the recent advancement of terminal and communication network technologies, types of services which can be provided for terminals through a communication network are diversifying.

For example, broadcasting services and Internet services using mobile communication terminals are being provided and at the same time, location-based services such as a friend finding service and a route guiding service are provided by exploiting characteristics of mobile communication terminals having superior mobility.

DISCLOSURE

Technical Problem

The present invention has been made in an effort to provide a mobile communication terminal, and a system and method for safety service using the method to easily check location and surrounding circumstances of a user at the time of emergency such as kidnapping, accident, and the like.

Technical Solution

To achieve the objective described above, a mobile communication terminal according to the present invention comprises a camera and a controller capturing the surroundings by controlling the camera at the time of an emergency mode.

Also, a secure service system including a mobile communication terminal according to the present invention comprises a function unit carrying out mobile communication to and from the outside and a camera capturing an image and a video, where the camera and the function unit communicates with each other through a wireless communication sold under the trademark BLUETOOTH® and the camera captures the surroundings independently of user commands at the time of an emergency mode.

Also, a safety service system including a mobile communication terminal according to the present invention comprises a camera, a first terminal including a controller controlling the camera for capturing images, a second terminal, and a server, where, if the first terminal is set to an emergency mode, the first terminal captures the surroundings by using the camera and transmits the captured images to the second terminal through the server.

Also, a safety service method including a mobile communication terminal according to the present invention, if a first terminal including a camera is set to an emergency mode, comprises capturing the surroundings by using the camera and transmitting location information of the first terminal to a second terminal through a server.

Advantageous Effects

According to the present invention, a mobile communication terminal and a system and method for safety service captures the surroundings by using a camera at the time of an emergency mode and provides captured images and location information of a user based on the captured images, thereby identifying the user's location more precisely and easily.

BEST MODE

Figure 1:
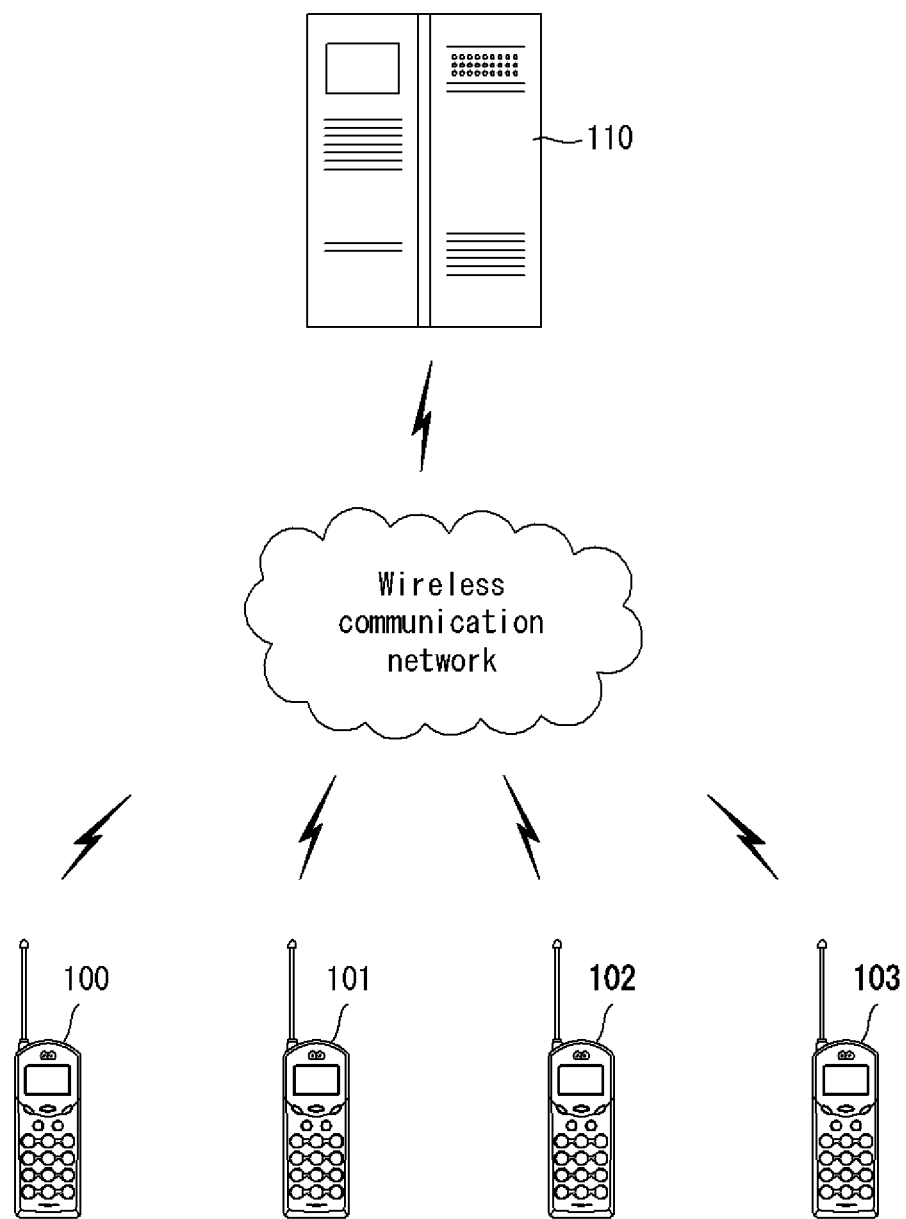
FIG. 1 illustrates a safety service system using a mobile communication terminal.

In what follows, a mobile communication terminal according to the present invention, and a system and method for safety service using the same will be described in detail with reference to appended drawings.

The present invention can be modified in various ways and various embodiments of the present invention can be realized; thus, this document illustrates particular embodiments in the appended drawings and detailed description of the embodiment will be provided. However, that is not meant for limiting the present invention to the particular embodiments; rather, it should be understood to include every possible modification, equivalent, or substitute of the present invention which belongs to the technical principles and scope of the present invention.

Terms such as first, second, and so on can be used for describing various components but the components should not be limited by the terms. The terms are introduced only for the purpose of distinguishing one component from the others. For example, a first component may be called a second component without departing from the scope of the present invention and vice versa.

The term of and/or indicates a combination of a plurality of related items described or any one of a plurality of related items described.

If a component is said to be "linked" or "connected" to a different component, the component may be directly linked or connected to the different component but a third component may exist to connect the two components even though the two components may be connected directly. On the other hand, if a component is said to be "linked directly" or "connected directly" to another component, it should be interpreted that there is no further component between the two components.

Terms used in this document have been introduced only to describe particular embodiment, not intended to limit the scope of the present invention. Singular expression should be interpreted to include plural expressions unless otherwise stated explicitly.

Terms such as "include" or "have" are meant to signify existence of embodied characteristics, numbers, steps, behavior, components, modules, and combinations thereof, which should be understood that possibility of existence or addition of one or more characteristics, numbers, steps, behavior, components, modules, and combinations thereof are not precluded beforehand.

Unless otherwise defined, all the terms used in this document, whether they are technical or scientific, possess the same meaning as understood by those skilled in the art to which the present invention belongs. The terms such as those defined in a dictionary for general use should be interpreted to carry the same contextual meaning in the related technology and they should not be interpreted to possess an ideal or excessively formal meaning.

In addition, the following embodiments are intended to describe completely the present invention for those having average knowledge of the art; therefore, shape and size of each element in the drawings may be exaggerated for the sake of more clear description.

FIG. 1 illustrates a safety service system using a mobile communication terminal.

As shown in the figure, a safety service system comprises a mobile communication terminal 100~103 including a camera (not shown) and a server 110 managing a plurality of mobile communication terminal 100~103.

A mobile communication terminal 10~103 is preferred to be the form of a mobile phone; the present invention can be applied to any kind of terminal once it includes a camera capable of capturing an image or video. For example, a navigation device including a camera can correspond to the mobile communication terminal 10~103.

The server 110 may be a server belonging to a communication operator side. The server 110 controls communication between mobile communication terminals 10~10. Also, the server 100 can transmit an image captured by an arbitrary mobile communication terminal at an emergency mode to a different mobile communication terminal or another server.

In what follows, a safety service system such as the above will be described in more detail.

Figure 2:
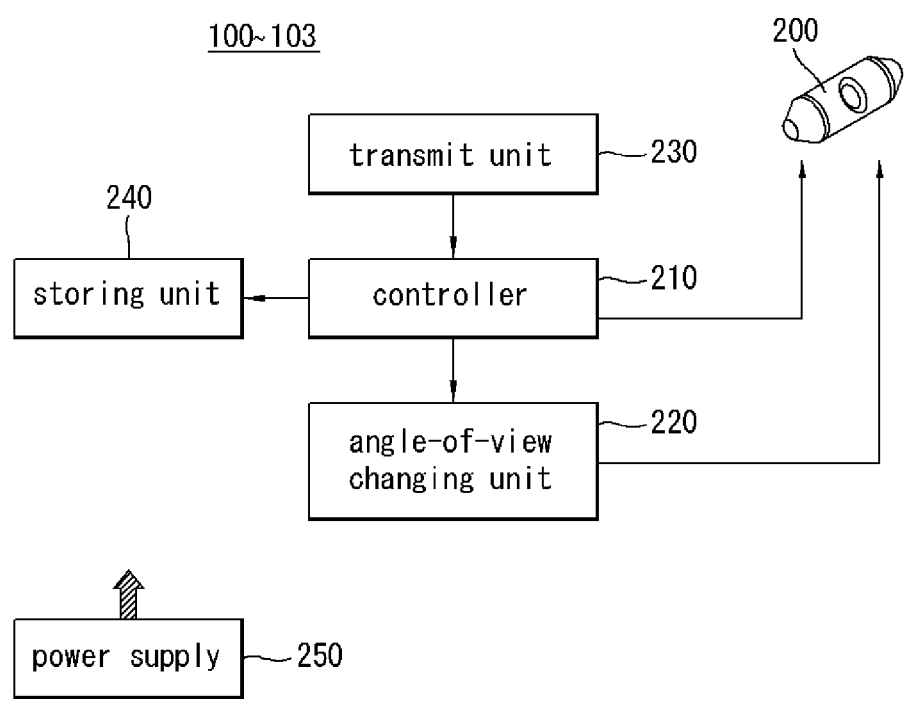
FIGS. 2 and 3 illustrate a structure of a mobile communication terminal.
Figure 3:
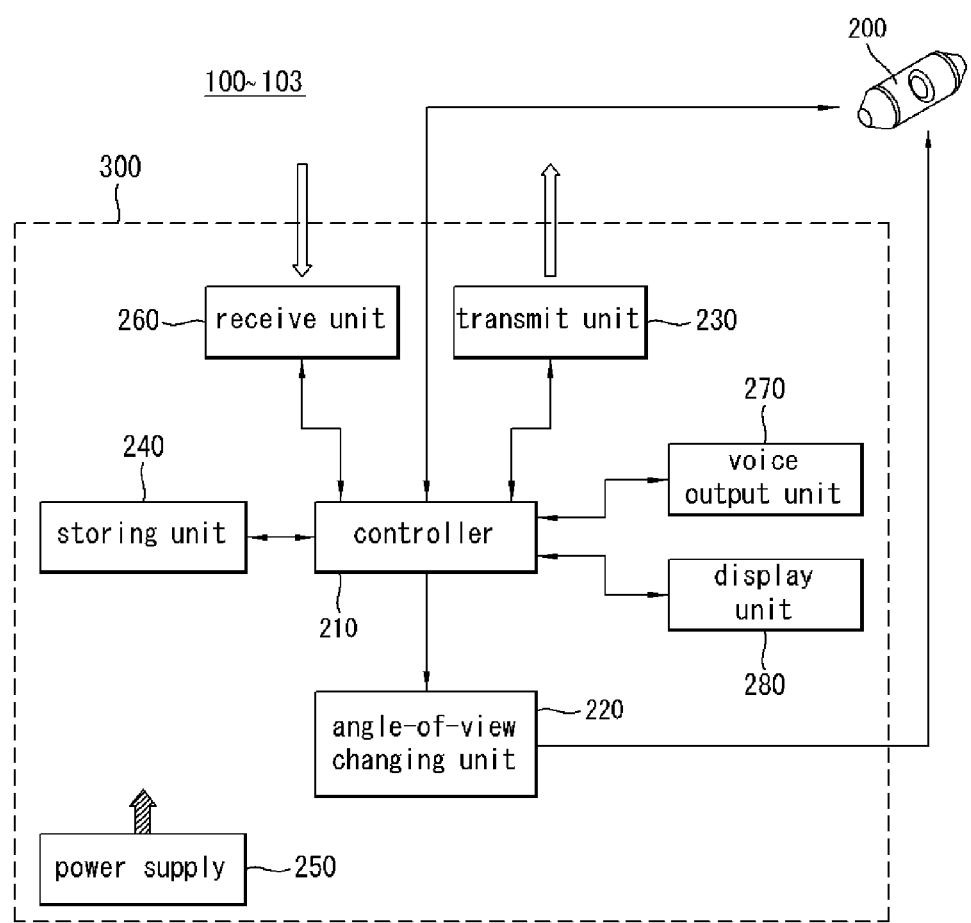

FIGS. 2 and 3 illustrate a structure of a mobile communication terminal.

First, as shown in FIG. 2, a mobile communication terminal 10~103 according to the present invention comprises a camera 200 and a controller 210.

The camera 200 can capture an image or a video.

The controller 210 can control the camera 200 to capture an image of the surroundings in case the mobile communication terminal 100~103 is set to an emergency mode. Preferably, the controller 210 can control the camera 200 to capture an image of the surroundings independently of user commands in case the mobile communication terminal 10~103 is set to an emergency mode. In what follows, description about the emergency mode will be provided in more detail.

In addition, the mobile communication terminal 10~103 can further comprise a angle-of-view changing unit 220, a transmit unit 230, a storing unit 240, and a power supply 250.

The angle-of-view changing unit 220 changes the angle-of-view of the camera 200 according to the control of the controller 210. The angle-of-view changing unit 220 may be a motor installed at the camera 200. Also, being combined with the camera 200, the angle-of-view changing unit 220 can be implemented in the form of a module.

The transmit unit 230 transmits data captured by the camera 200, namely, an image or a video, to a server or a different mobile communication terminal.

The storing unit 240 stores the data captured by the camera 200.

The power supply 250 supplies power required for operating the mobile communication terminal 100~130.

Next, FIG. 3 illustrates a block diagram for which a mobile communication terminal 100~130 according to the present invention is applied to a mobile phone. In what follows, those already described in detail in FIG. 2 will be omitted.

As shown in FIG. 3, a mobile communication terminal 100~130 according to the present invention comprises a camera 200 and a function unit 300.

Here, the function unit 300 comprises a controller 210, an angle-of-view changing unit 220, a transmit unit 230, a storing unit 240, a power supply 250, a receive unit 260, a voice output unit 270, and a display unit 280.

The receive unit 260 receives voice information, text information, data information, image information, video information, and so on from, for example, a server or a different terminal.

The voice output unit 270 outputs voice information received by the receive unit 260 for the user to listen to the information according to the control of the controller 210.

The display unit 280 outputs text information, data information, image information, and video information received by the receive unit 260 for the user to check the information according to the control of the controller 210.

The storing unit 240 stores an image or a video captured by the camera 200 and moreover, stores various types of information received by the receive unit 260 according to the control of the controller 210.

The controller 210 controls the camera 200 to capture an image or a video of the surroundings by controlling the camera 200 and also controls voice communication and transmission and reception of information. In other words, the controller 210 controls the operation of the camera 200, receive unit 260, transmit 230, storing unit 240, voice output unit 270, angle-of-view changing unit 220, power supply 250, and display unit 280.

Here, the function unit 300 may indicate a part of the mobile communication terminal 100~130 excluding the camera 200.

The mobile communication terminal 10~103 having the structure as described above can be set to an emergency mode in the case of an emergency such as kidnapping, accident, and so on.

In the case of emergency mode, the camera 200 can take an image or a video of its surroundings according to the control of the controller 210 and can also transmit the image or video to the outside through the transmit unit 230 and can store the image or video in the storing unit 240.

In addition, in the case of emergency mode, it is possible for the camera 200 to take an image or a video of the surroundings at predetermined intervals. Similarly, in the case of emergency mode, it is equivalently possible for the camera to capture an image or a video of its surroundings for a predetermined number of times.

To increase the capture effect of the camera 200, it is preferable for the mobile communication terminal 10~103 according to the present invention to be implemented as a module independent from the function unit 300. For example, it is possible that the function unit 300 is incorporated into the main body of the mobile communication terminal and the camera 200 is implemented as a single module separated from the function unit 300. In addition, the camera module can be installed at the position where a field-of-view of the camera is secured.

Other than the emergency mode, the mobile communication terminal 10~103 can be set to a normal mode. Also, in the case of normal mode, different from the emergency mode, compulsory capture, transmission, and storage of an image or a video using the camera 200 may not be carried out.

In what follows, the emergency mode introduced above will be described in more detail.

FIGS. 4 to 11 illustrate an emergency mode in more detail.

First, the emergency mode is set in case the user leaves a predetermined region (safety zone SZ).

Figure 4:
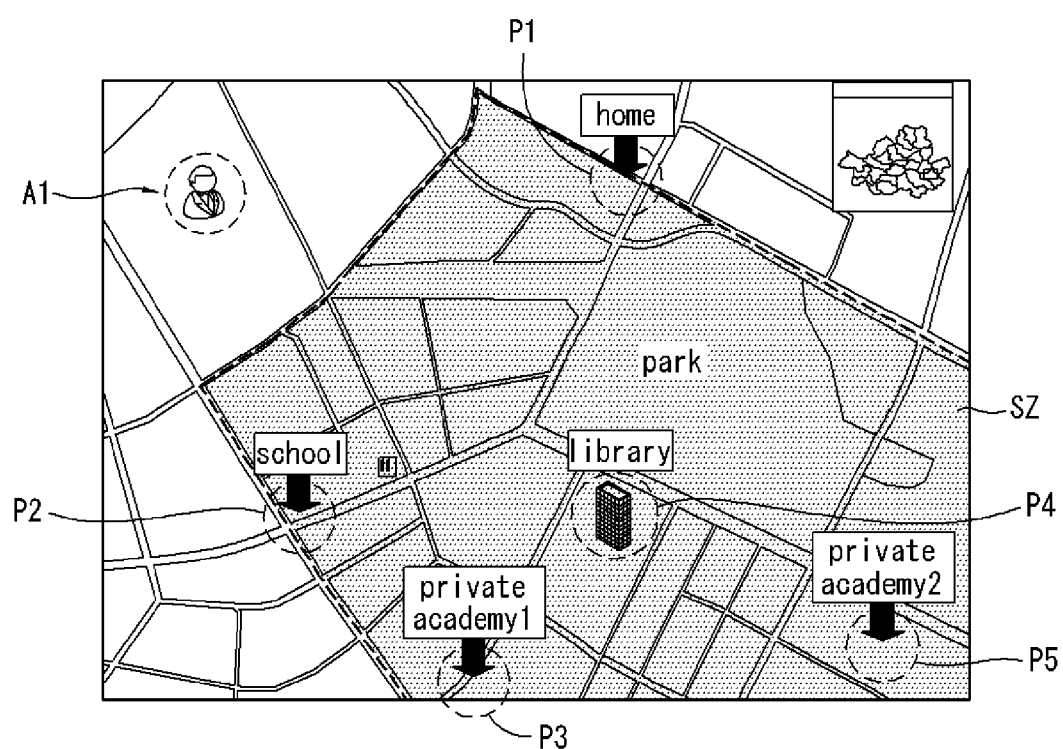
FIGS. 4 to 11 illustrate an emergency mode in more detail.

As shown in FIG. 4, the user can set an arbitrary region as a safety zone. The dark shaded region of FIG. 4 corresponds to a safety zone.

In this case, as shown in FIG. 4, if a mobile communication terminal is located at a position A1 out of the safety zone, the corresponding mobile communication terminal can be set to the emergency mode.

For example, as shown in FIG. 4, parents may set up an arbitrary area including a home P1, a school P2, a private academy1 P3, a library P4, and a private academy2 P5 as the safety zone SZ of the mobile communication terminal of their child and transmit the set-up information to a server. In this case, if their child leaves the safety zone, the server recognizes that the mobile communication terminal of their child has left the pre-set safety zone and transmits an emergency mode set-up command to the mobile communication terminal of their child.

In other words, in case a predetermined mobile communication terminal leaves a pre-set safety zone, it is possible for a server managing the mobile communication terminal to transmit an emergency mode set-up command to the corresponding mobile communication terminal, thereby setting up the corresponding mobile communication terminal to the emergency mode.

Similarly, a program can be installed in the mobile communication terminal, which is intended for setting the corresponding mobile communication terminal to the emergency mode when the mobile communication terminal leaves a safety zone. In this case, the corresponding mobile communication terminal recognizes its departure from the safety zone based on its location information received from the server and activates the emergency mode.

For setting up a safety zone, various options can be taken into account, including a method of using an address, a method of selecting an arbitrary area on the map, and so on.

For example, the user may set up the address ranging from 100 to 200 of Nahyeon-dong, Gwanak-gu, Seoul as a safety zone. Likewise, the user may set up an arbitrary area as a safety zone by employing a method of dragging a mouse on the map. Moreover, the user may set up a safety zone by selecting an arbitrary block on the map. Methods for setting up a safety zone are not limited to the above examples.

Meanwhile, the emergency mode can be set up for the case where the user stays in a pre-determined area (dangerous zone DZ).

Figure 5:
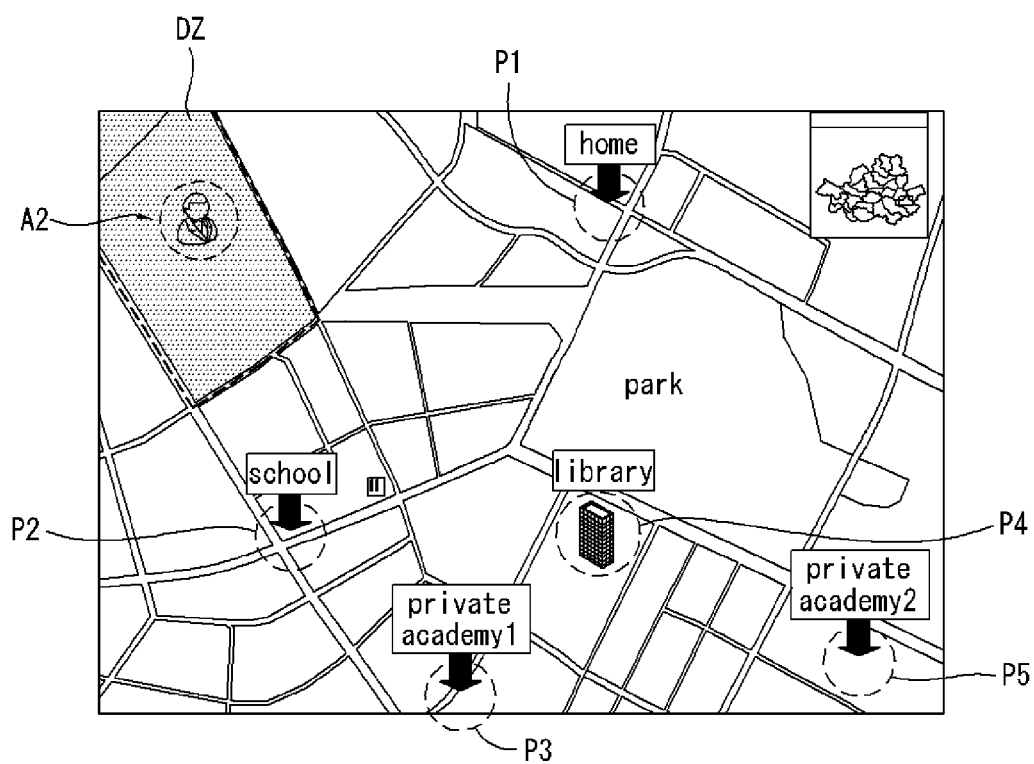

As shown in FIG. 5, the user can set up an arbitrary area as a dangerous zone. The dark shaded area in FIG. 5 corresponds to a dangerous area.

As shown in FIG. 5, in this case, if a mobile communication terminal is located at a position A2 within the dangerous zone, it is possible to set the corresponding mobile communication terminal to the emergency mode.

For example, parents can set up an area populated with bars as a dangerous zone of a mobile communication terminal of their child and transmit the set-up information to a server. In this case, if their child enters the dangerous zone, the server recognize entry of the mobile communication terminal of their child into a predetermined dangerous zone and transmits an emergency mode set-up command to the mobile communication terminal of their child. Accordingly, the mobile communication terminal of their child is set to the emergency mode.

As described above, if the mobile communication terminal of their child is set to the emergency mode, the camera of the mobile communication terminal of their child captures an image or a video of the surroundings and transmits the captured image or video to the mobile communication terminal of parents through the server. Then the parents can obtain information about a situation, the surroundings, nearby buildings, and so on from the mobile communication terminal of their child in the emergency mode. Afterwards, parents can take a prompt action such as reporting emergency to the police and accordingly, their child can be protected from a danger.

Also, a program can be installed in the mobile communication terminal, which is intended for setting the corresponding mobile communication terminal to the emergency mode when the mobile communication terminal enters a dangerous zone. In this case, the corresponding mobile communication terminal decides based on location information received from a server that its position has entered a dangerous zone and thus activates emergency mode.

A method for setting up a dangerous zone can be fully inferred through the previous description about a method for setting up a safety zone; therefore, detailed description thereof will be omitted.

Also, emergency mode can be set up for the case where the user deviate a predetermined route.

Figure 6:
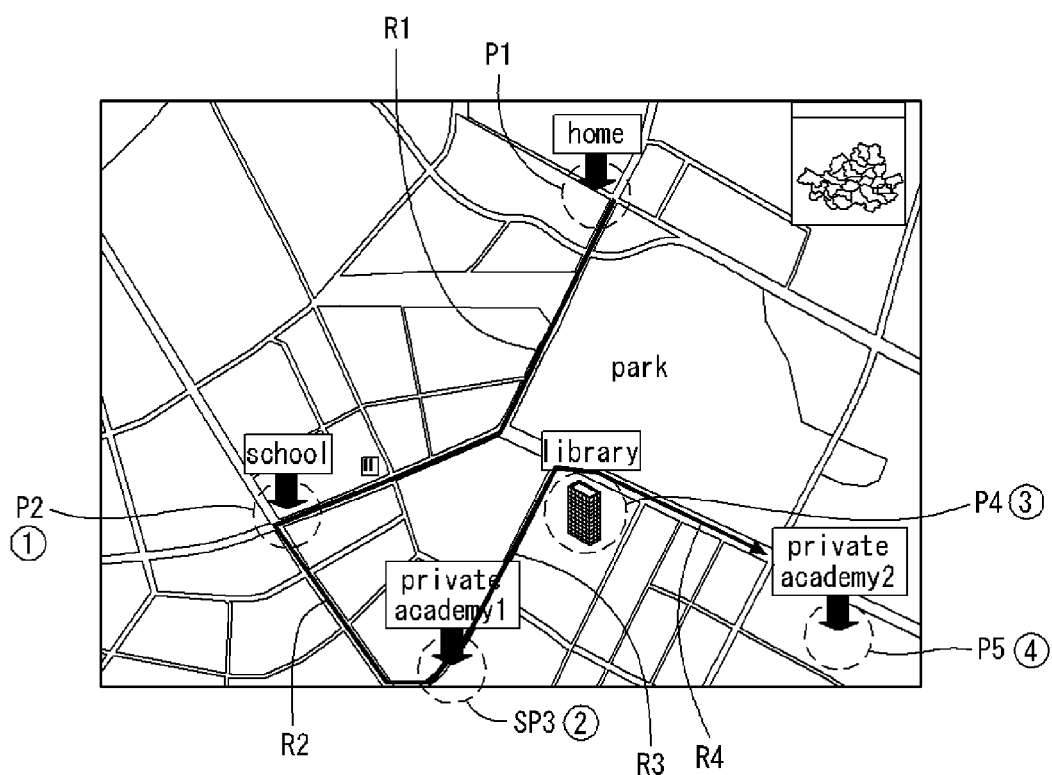

For example, as shown in FIG. 6, the user may set up a route within an arbitrary area, comprising a first route R1 from his or her home P1 to a school P2, a second route from the school P2 to a private academy1 P3, a third route from the private academy P30 to a library P4, and a fourth route from the library P4 to a private academy2 P5. Also, the user can determine the order of passage for individual via points. The numeral ①②③④ marked for each element of FIG. 6 represents the order of via points through which the user passes.

Figure 7:
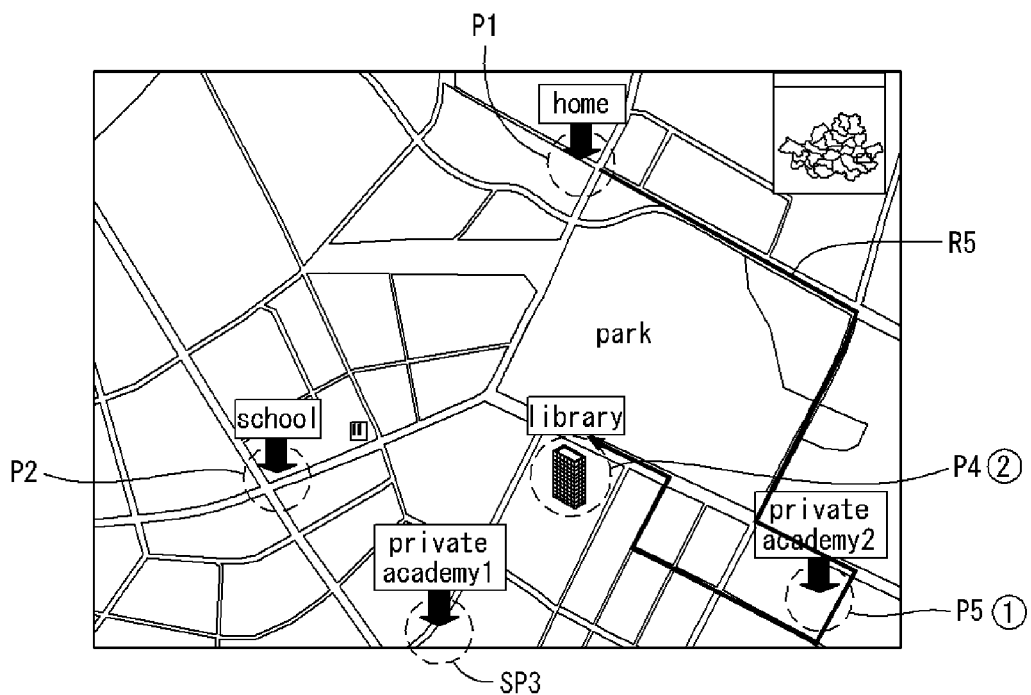

As shown in FIG. 7, in this setting, if the mobile communication terminal moves from home P1 to the private academy P5 via a fifth route R5 other than the predetermined first, second, third, and fourth route R1, R2, R3, R4, it is possible that the corresponding mobile communication terminal is set to the emergency mode.

For example, parents may set the route R1, R2, R3, R4 of a mobile communication terminal of their child beforehand and transmit the preset route to the server. In this case, if their child moves along a different route other than the preset route R1, R2, R3, R4, the server recognizes departure of the mobile communication terminal of the child from the preset route and transmits an emergency mode set-up command to the mobile communication terminal of the child. Accordingly, the mobile communication terminal of the child can be set to the emergency mode.

Similarly, a program can be installed in the mobile communication terminal, which is intended for setting the corresponding mobile communication terminal to the emergency mode when the mobile communication terminal leaves a predetermined route. In this case, the corresponding mobile communication terminal decides based on location information received from a server that its position has left a predetermined route and thus activates emergency mode.

Also, the emergency mode can be set up in case the user does not follow the order of predetermined passages.

For example, as shown in FIG. 6, the user may set up an order of passages within an arbitrary area, where a first route ① starts from home P1 to school P2; a second route ② from the school P2 to a private academy1 P3, a third route ③ from a private academy P3 to a library P4, and a fourth route ④ from the library P4 to a private academy2 P5.

Figure 8:
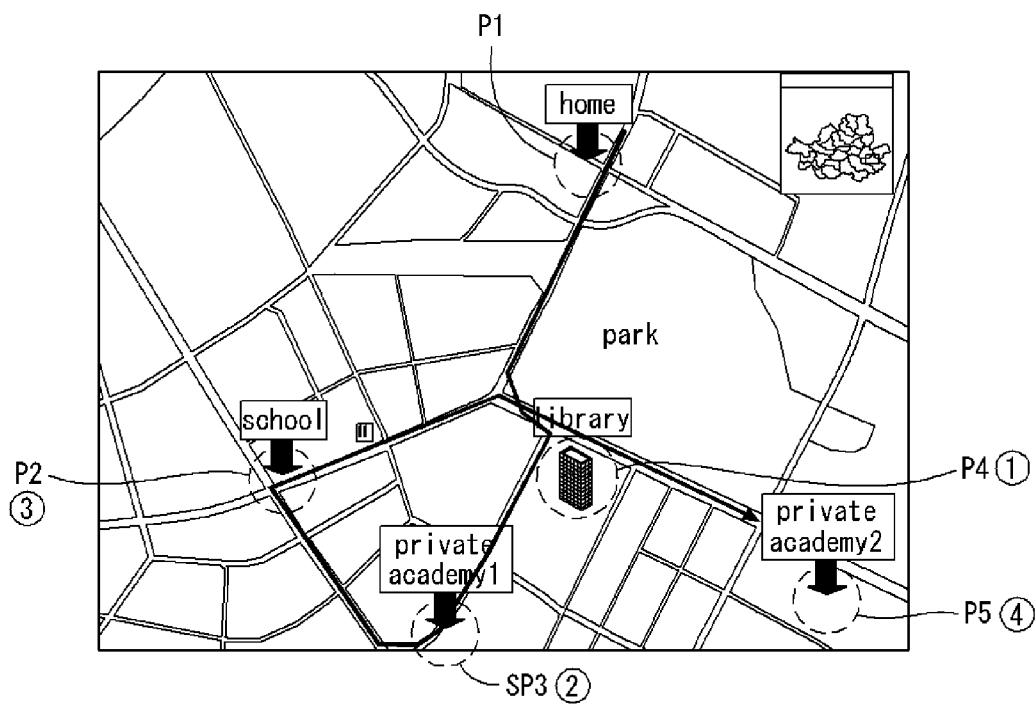

In this case, as shown in FIG. 8, if the mobile communication terminal moves in a different order other than the predetermined order of passages, in other words, if the user moves along a route ① from home P1 to the library P4 and then moves along a route ② from the library P4 to the private academy1 P3 and then moves along a route ③ from the private academy1 P3 to the school P2 and then moves along a route ④ from the school P2 to the private academy2 P5, it is possible to set up the corresponding mobile communication terminal to emergency mode.

For example, parents can determine the order of routes ①②③④ for the mobile communication terminal of their child beforehand and transmit the predetermined information to the server. In this case, if the child moves in a different route order other than the predetermined order of routes, the server recognizes that the child's mobile communication terminal has left the order of routes and transmits an emergency mode set-up command to the child's mobile communication terminal. Accordingly, the child's mobile communication terminal can be set to the emergency mode.

Similarly, a program can be installed in the mobile communication terminal, which is intended for setting the corresponding mobile communication terminal to the emergency mode when the mobile communication terminal does not follow the order of routes. In this case, the corresponding mobile communication terminal decides based on location information received from a server that its position has left a predetermined order of routes and thus activates emergency mode.

For example, according to the order of routes as shown in FIG. 6, the time at which the terminal passes the school P2 precedes the time of passing the library P4. Meanwhile, if the user follows the route order as shown in FIG. 8, the time at which the terminal passes the library P4 precedes the passage time for the school P2. In this manner, if time to pass for each via point is compared with one another, the order of routes can be checked and based on the checking result, it is possible to set the corresponding mobile communication terminal to emergency mode.

Similarly, it is possible for the user of the corresponding mobile communication terminal to input the emergency mode set-up command directly.

For example, the user of a mobile communication terminal can input the emergency mode set-up command directly by pushing an emergency mode set-up button prepared in the mobile communication terminal of the user at the time of an emergency situation such as when the user feels a threat being surrounded by hooligans. In that case, since an image or a video of the hooligans captured by the camera of the mobile communication terminal of the user can be transmitted to a server, it would be useful to protect the user from a potential crime or to arrest offenders.

Likewise, it is possible to set up emergency mode by receiving an emergency mode set-up command from a different terminal.

For example, parents can transmit an emergency mode set-up command to the mobile communication terminal of their child by using a mobile communication terminal, Internet, wired phone, and so on.

In this case, the image or video captured by the camera of the mobile communication terminal of their child is transmitted to the parents through a server. Accordingly, it is possible for the parents to easily obtain information about a situation in which their child confronts or precise location of their child.

Also, it is possible to set a mobile communication terminal to emergency mode if an impact is applied to the corresponding mobile communication terminal.

For example, in case the user of a mobile communication terminal gets into an accident being hit by a car while walking along or a relatively big impact is applied to the mobile communication terminal as the user is attacked by a stranger, the corresponding mobile communication terminal can be set to emergency mode.

Figure 9:
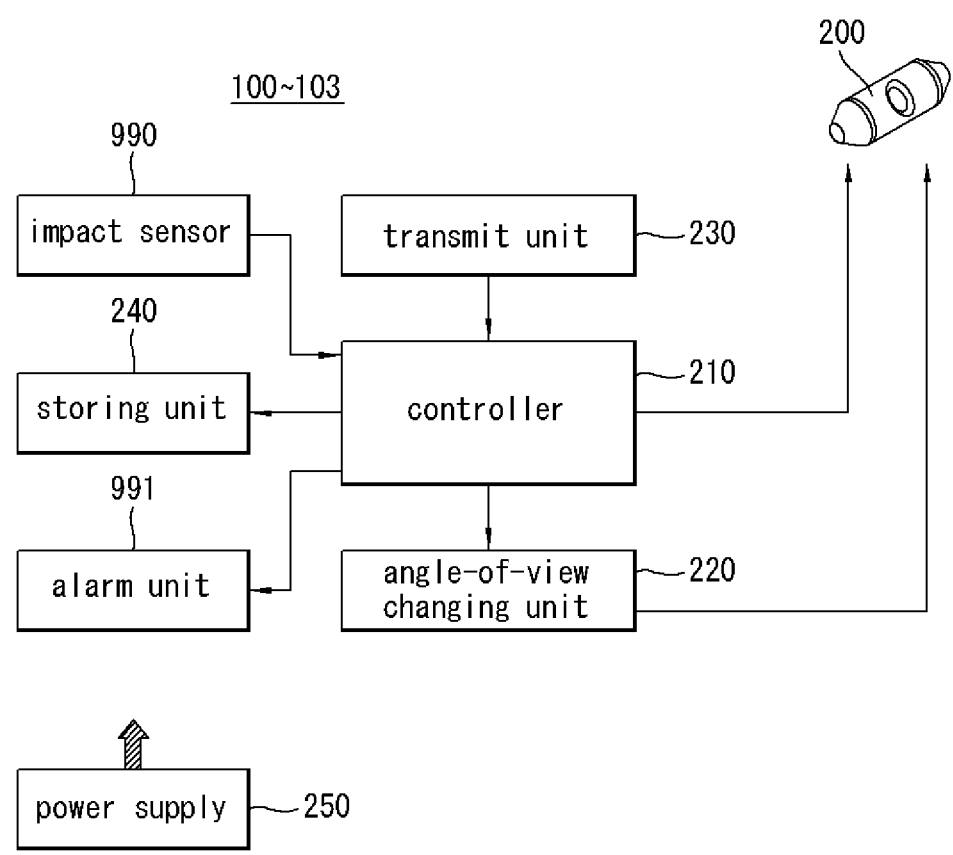

To this purpose, as shown in FIG. 9, it may be more preferable that a mobile communication terminal according to the present invention further comprises an impact sensor 990.

The impact sensor 990 can sense impact applied from the outside to the mobile communication terminal 100~103.

The controller 210 can determine whether to set up emergency mode by using an amount of impact sensed by the impact sensor 990. Preferably, the controller 210 set up emergency mode in the case where an amount of impact sensed by the impact sensor 990 exceeds a predetermined critical value CV.

Figure 10:
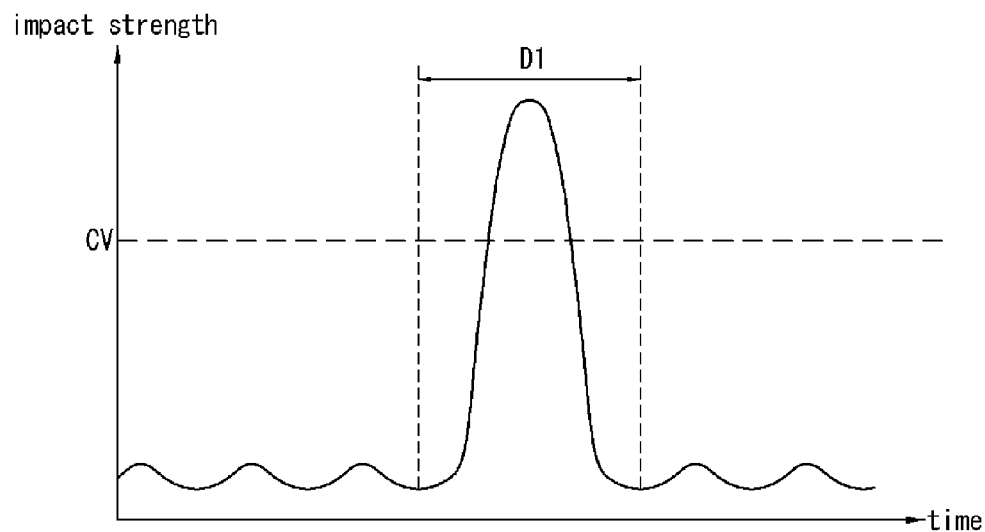

For example, as shown in FIG. 10, if impact larger than a predetermined critical value is applied from the outside for the duration of D1, the mobile communication terminal can be set to emergency mode according to the control of the controller 210. In this case, since a camera is able to capture a current situation of the surroundings from the time at which impact is applied to the mobile communication terminal, post processing of an accident may be easily handled.

Likewise, the controller 210 may set up emergency mode in the case where a change of the amount of impact sensed by the impact sensor 990 is relatively large.

Figure 11:
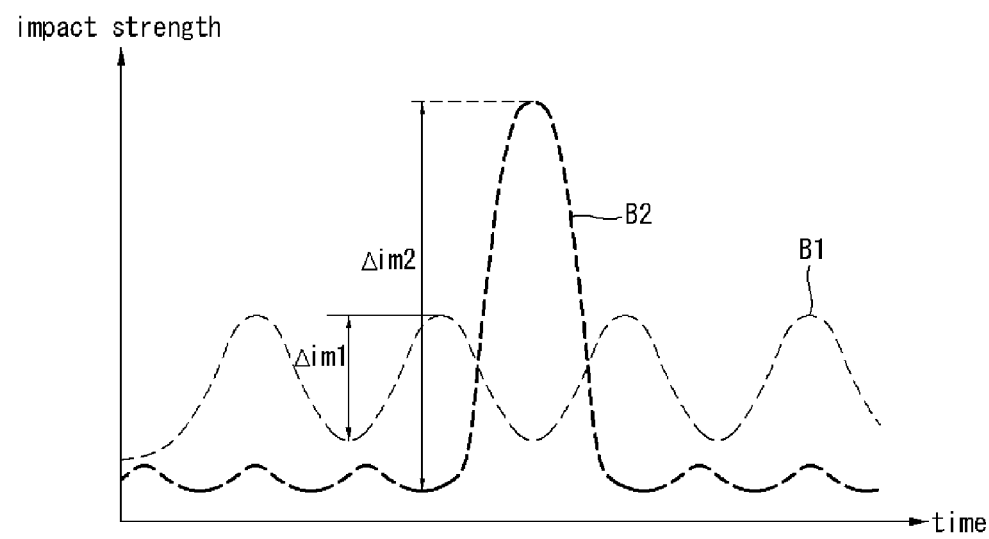

For example, as shown in FIG. 11, if impact is applied to a mobile communication terminal according to a first pattern B1, the difference $\Delta im1$ between current impact and previous one is relatively small. On the other hand, if impact is applied to the mobile communication terminal according to a second pattern B2, the difference $\Delta im2$ is larger than that of the case of the first pattern B1. In this case, emergency mode can be set up for the case where impact according to the second pattern B2 is applied to the mobile communication terminal. It should be noted that if impact according to the first pattern B1 is applied to the mobile communication terminal, normal mode can be set up instead of emergency mode.

The impact following the first pattern B1 is most likely to correspond to an impact pattern generated when the user makes a regular motion such as running, horseback riding, and the like.

On the other hand, the impact following the second pattern B2 may correspond to a case where an excessively large impact compared with a previous one is applied instantaneously to the mobile communication terminal.

Therefore, compared with the impact from the first pattern B1, since it is more likely for the impact according to the second pattern B2 to have been generated from an urgent situation such as an accident, it is preferable to set the mobile communication terminal to emergency mode when an impact according to the second pattern B2 is applied.

In a similar manner, the corresponding mobile communication terminal can be set to the emergency mode when a difference between a current amount of impact and the amount of previous impact is larger than a predetermined critical value.

Meanwhile, it may be preferable to apply at least two or more conditions together among the emergency mode set-up conditions above meant for a mobile communication terminal. More preferably, all of the emergency mode set-up conditions above meant for a mobile communication terminal can be used.

Meanwhile, the mobile communication terminal can further comprise an alarm unit 991. The alarm unit 991 can inform the user about whether to set up an emergency mode at the time of an emergency. For example, the mobile communication terminal can make the user recognize activation of an emergency mode by using vibration, sound, light, and so on.

Also, though not shown in the figure, by displaying activation status of emergency mode on the display unit, the user can be notified of activation of the emergency mode. In this case, the alarm unit 991 can be removed.

FIGS. 12 to 16 illustrate change of angle-of-view in detail.

Figure 12:
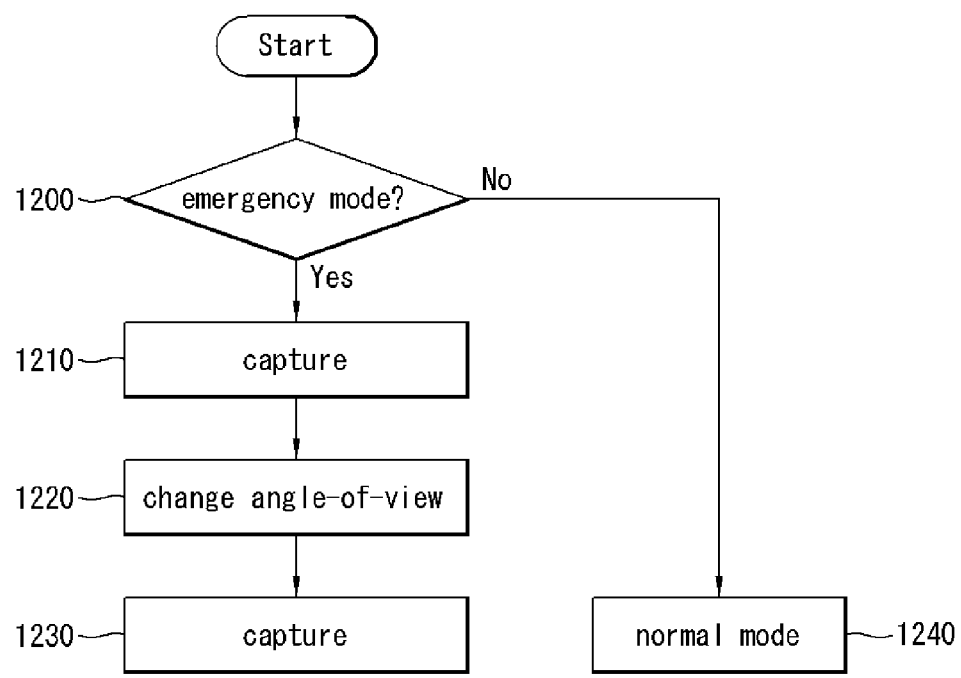
FIGS. 12 to 16 illustrate change of angle-of-view in detail.

As shown in FIG. 12, first of all, whether it is emergency mode is determined 1200.

As a result of determination, if it is not in the emergency mode, a mobile communication terminal can be set to a normal mode 1240.

On the other hand, if it corresponds to the emergency mode as a result of determination, an image or a video of the surroundings can be captured by using a camera included in the mobile communication terminal 1210.

Afterwards, the surroundings can be captured again after angle-of-view of the camera is changed 1220.

In this way, since a situation of the surroundings can be more clearly captured if the surroundings are captured as the angle-of-view of the camera is changed, accident handling, acquisition of more precise location information, and so on can be made easy.

Figure 13:
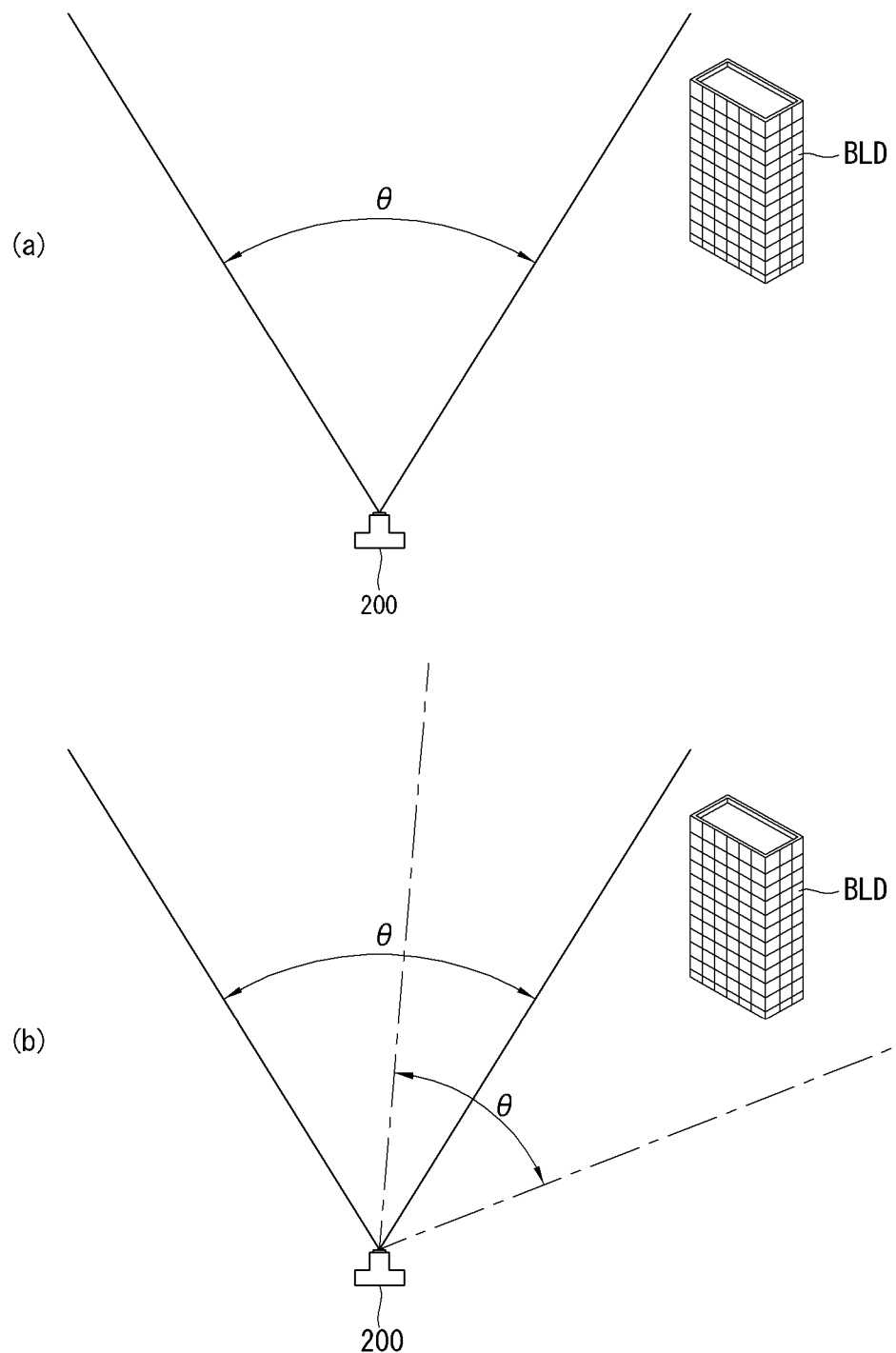

For example, as shown in FIG. 13(*a*), in case the angle-of-view is not changed and the user of a mobile communication terminal loses senses from a car accident while walking, without help from others, the camera of the user's mobile communication terminal operating in emergency mode is limited to capture an image or a video of a confined area only.

Accordingly, there may be a case where the camera fails to capture an image of a landmark in the corresponding area, for example, a building, with which the location of the accident can be identified. In this case, it may be difficult to identify the location of the accident exactly.

Meanwhile, as shown in FIG. 13(*b*), if the angle-of-view of the camera in the mobile communication terminal can be changed at the time of emergency mode, a possibility of capturing a landmark in that area is improved even when the user loses senses. Accordingly, more exact location of the accident can be obtained.

Figure 14:
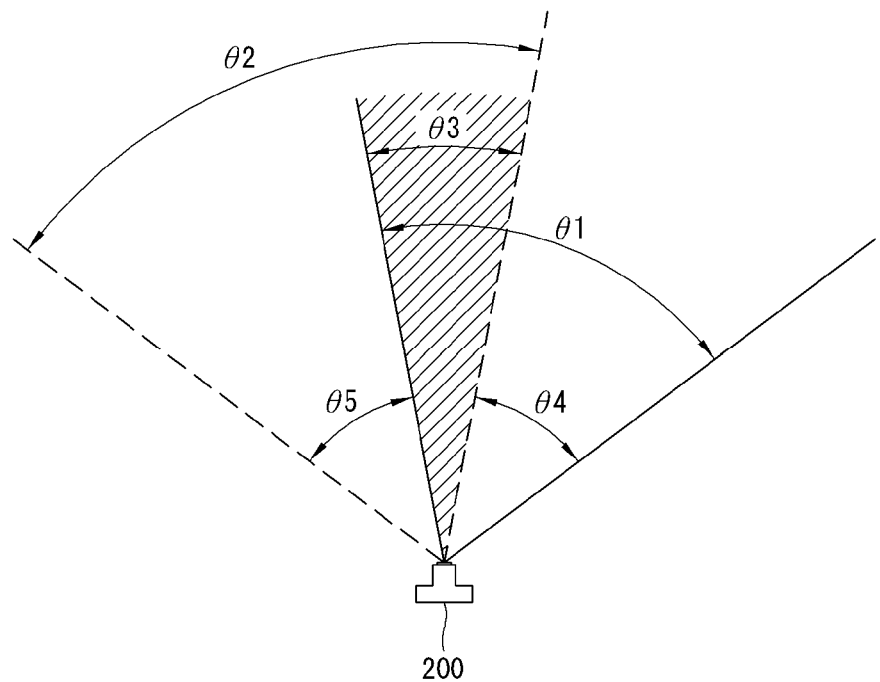

As shown in FIG. 14, a camera of a mobile communication terminal according to the present invention can take an image or a video of the surroundings with two angle-of-views. In other words, the camera's angle-of-view includes a first angle-of-view $\theta 1$ and a second angle-of-view $\theta 2$.

For example, the camera first takes an image or a video of the surroundings with the first angle-of-view $\theta 1$ and can then take an image or a video again after changing its angle-of-view from the first $\theta 1$ to the second angle-of-view $\theta 2$.

In this case, to make the image or video captured with the first angle-of-view $\theta 1$; and the image or video captured with the second angle-of-view $\theta 2$ be seamlessly played, it is preferable to make the first angle-of-view $\theta 1$ and the second angle-of-view $\theta 2$ overlap with each other.

FIG. 14 illustrates a case where an overlapping angle between the first angle-of-view $\theta 1$ and the second angle-of-view $\theta 2$ is $\theta 3$.

It should be noted that the overlapping angle $\theta 3$ between the first $\theta 1$ and the second angle-of-view $\theta 2$ is smaller than the angle $\theta 4$ of the first angle-of-view $\theta 1$ non-overlapping with the second angle-of-view $\theta 2$ and the angle $\theta 5$ of the second angle-of-view $\theta 2$ non-overlapping with the first angle-of-view $\theta 1$.

It is also possible for the case where a change in angle-of-view is relatively small due to limitation of a movement range of the camera that the overlapping angle $\theta 3$ between the first $\theta 1$ and the second angle-of-view $\theta 2$ is larger than the angle $\theta 4$ of the first angle-of-view $\theta 1$ non-overlapping with the second angle-of-view $\theta 2$ and the angle $\theta 5$ of the second angle-of-view $\theta 2$ non-overlapping with the first angle-of-view $\theta 1$.

Figure 15:
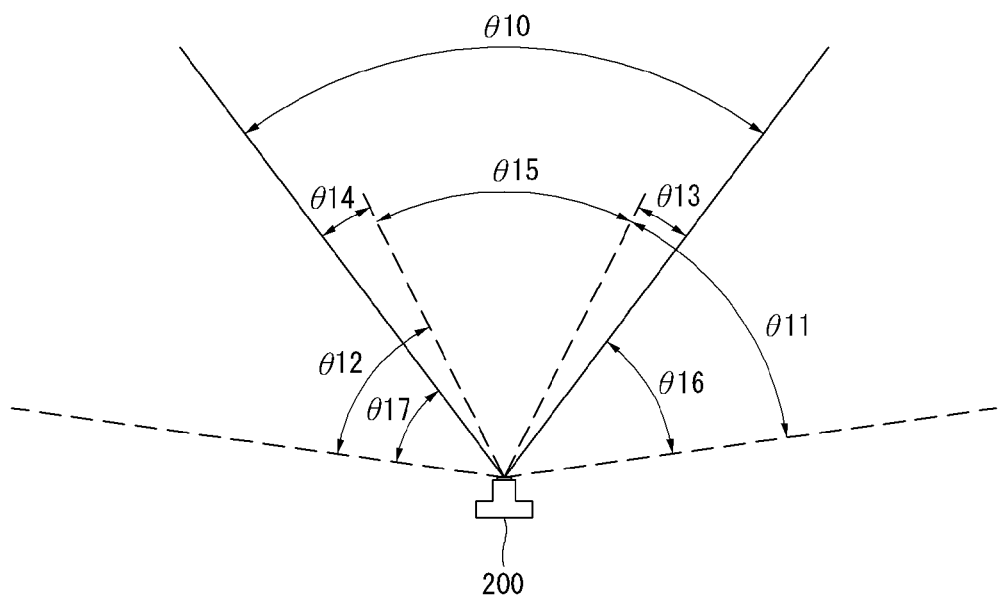

As shown in FIG. 15, the angle-of-view of a camera can be chosen in three ways. In this case, it can be regarded that the angle-of-view includes a first angle-of-view $\theta 10$, a second angle-of-view $\theta 11$, and a third angle-of-view $\theta 12$.

For example, to change the angle-of-view sequentially, it is possible for the camera to take an image or a video in the order of the first angle-of-view $\theta 10$, second angle-of-view $\theta 11$, first angle-of-view $\theta 10$, third angle-of-view $\theta 12$, and first angle-of-view $\theta 10$.

Here, to preserve continuity of images or videos captured by the camera, the first angle-of-view $\theta 10$ and the second angle-of-view $\theta 11$ overlaps with each other; and the first angle-of-view $\theta 10$ and the third angle-of-view $\theta 12$ overlaps with each other.

Also, it is possible for the first $\theta 10$, second $\theta 11$, and third angle-of-view $\theta 12$ to have the same angle. In this case, control of the angle-of-view is made easy.

On the other hand, at least one of the first $\theta 10$, second $\theta 11$, and third angle-of-view $\theta 12$ may differ from the others. For example, the first angle-of-view $\theta 10$ corresponding to the central part can be larger than at least one of the second $\theta 11$ and the third angle-of-view $\theta 12$.

Also, the angle $\theta 13$ formed by overlapping between the first angle-of-view $\theta 10$ and the second angle-of-view $\theta 11$; and the angle $\theta 12$ formed by overlapping between the first angle-of-view $\theta 10$ and the third angle-of-view $\theta 12$ may be narrower than the angle $\theta 15$ belonging to the first angle-of-view $\theta 10$ and not overlapping with the second $\theta 11$ and the third angle-of-view $\theta 12$. In this case, capturing an image or a video for a larger area is possible.

Also, the angle $\theta 13$ formed by overlapping between the first angle-of-view $\theta 10$ and the second angle-of-view $\theta 11$; and the angle $\theta 12$ formed by overlapping between the first angle-of-view $\theta 10$ and the third angle-of-view $\theta 12$ may be narrower than the angle $\theta 16$ belonging to the second angle-of-view $\theta 11$ but not overlapping with the first angle-of-view $\theta 10$. Also, the angle $\theta 13$ formed by overlapping between the first angle-of-view $\theta 10$ and the second angle-of-view $\theta 11$; and the angle $\theta 12$ formed by overlapping between the first angle-of-view $\theta 10$ and the third angle-of-view $\theta 12$ may be narrower than the angle $\theta 17$ belonging to the third angle-of-view $\theta 12$ but not overlapping with the first angle-of-view $\theta 10$.

As described above, a relatively small angle $\theta 13$, $\theta 14$ formed by overlapping angle-of-views can be appropriate for the case where the angle-of-view of the camera is small but changing angle-of-view of the camera is carried out with ease.

Figure 16:
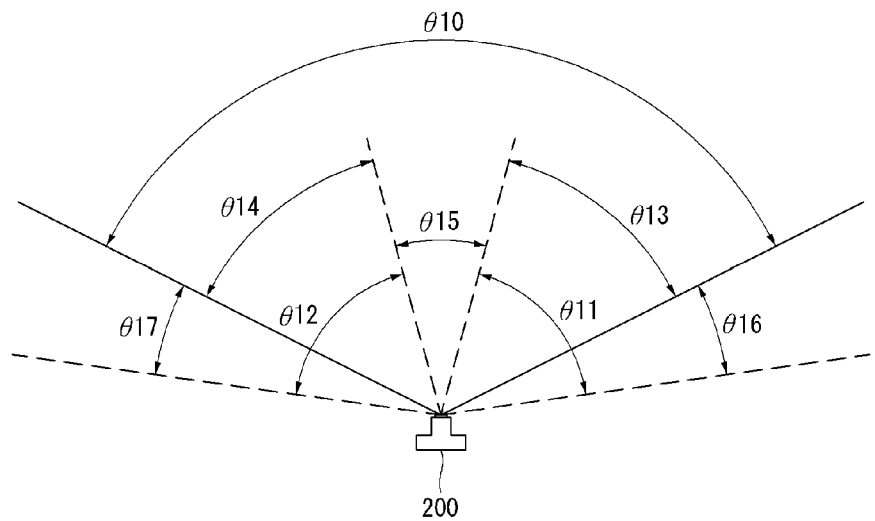

Similarly, as shown in FIG. 16, it is also possible that the angle $\theta 13$ formed by overlapping between the first $\theta 10$ and the second angle-of-view $\theta 11$; and the angle $\theta 12$ formed by overlapping between the first $\theta 10$ and the third angle-of-view $\theta 12$ is larger than the angle $\theta 15$ belonging to the first angle-of-view $\theta 10$ but not overlapping with the second $\theta 11$ and the third angle-of-view $\theta 12$. In this case, too, capturing an image or a video for a large area is possible.

Still, the angle $\theta 13$ formed by overlapping between the first $\theta 10$ and the second angle-of-view $\theta 11$; and the angle $\theta 12$ formed by overlapping between the first $\theta 10$ and the third angle-of-view $\theta 12$ may be larger than the angle $\theta 16$ belonging to the second angle-of-view $\theta 11$ but not overlapping with the first angle-of-view $\theta 10$. Also, the angle $\theta 13$ formed by overlapping between the first $\theta 10$ and the second angle-of-view $\theta 11$; and the angle $\theta 12$ formed by overlapping between the first $\theta 10$ and the third angle-of-view $\theta 12$ may be larger than the angle $\theta 17$ belonging to the third angle-of-view $\theta 12$ but not overlapping with the first angle-of-view $\theta 10$.

As described above, a relatively large angle $\theta 13$, $\theta 14$ formed by overlapping angle-of-views can be appropriate for the case where the angle-of-view of the camera is large but changing angle-of-view of the camera is not easily done.

Figure 17:
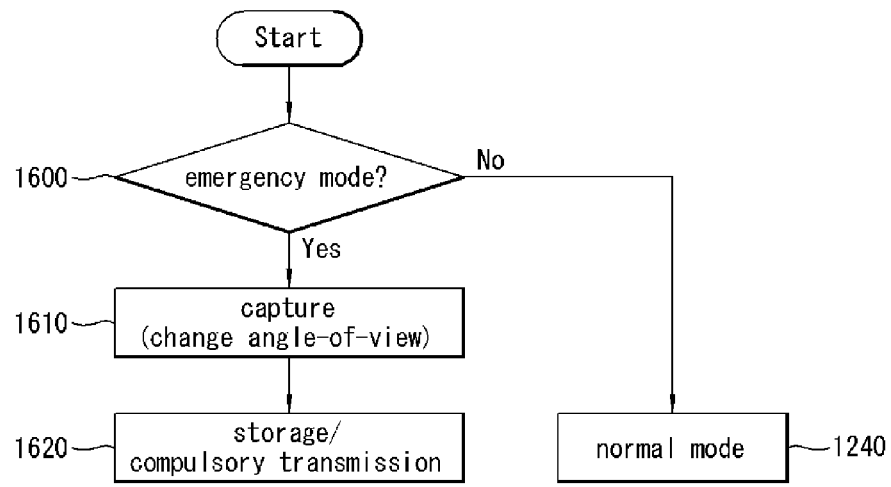
FIGS. 17 and 18 illustrate storing of captured images.
Figure 18:
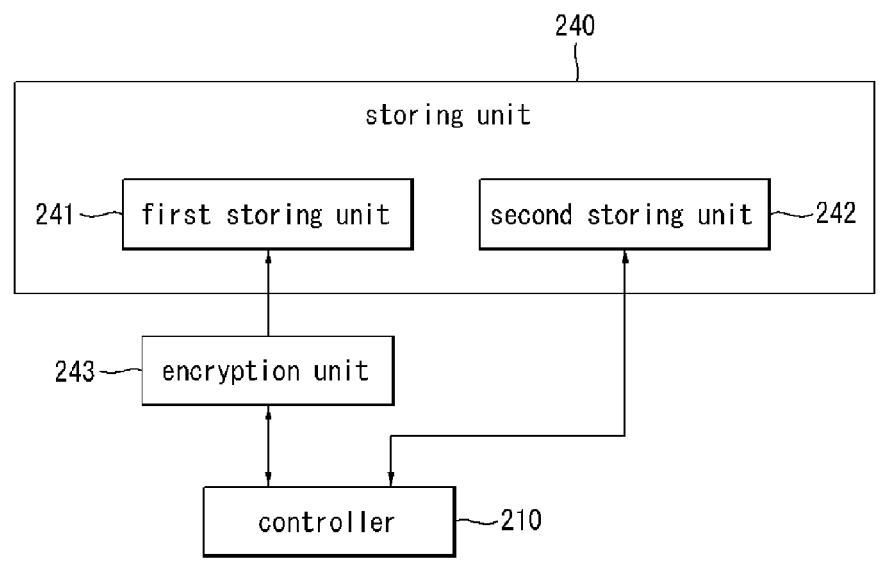

FIGS. 17 and 18 illustrate storing of captured images.

With reference to FIG. 17, whether it is emergency mode is determined 1600; in the case of emergency mode, the camera can take an image or video of the surroundings. Here, it is possible to change the angle-of-view of the camera.

After image or video capture, captured image or video can be stored in the storing unit 1620. Also, captured image or video can be transmitted to the outside independently of a command input of the user. In other words, the image or video can be forced to be transmitted.

At the same time, it may be preferable to store the data captured at the time of emergency mode to protect the data captured by the camera at the time of emergency mode.

For example, it would be preferable to store data captured at the time of emergency mode after encryption of the data to avoid manipulating or deleting data from the scene of an accident such as a hit-and-run by another person.

To this purpose, space for storing encoded, captured data can be assigned to the storing unit of a mobile communication terminal according to the present invention.

For example, as shown in FIG. 18, the storing unit 240 can comprise a first 241 and a second storing unit 242. Moreover, it is possible for a mobile communication terminal according to the present invention to further comprise an encryption unit 243 for encryption of data captured at the time of an emergency.

The first storing unit 241 can stored data captured at the time of emergency mode. In other words, the first storing unit 241 can stored captured data encrypted.

The second storing unit 242 can store data captured during a normal mode rather than the emergency mode.

Figure 19:
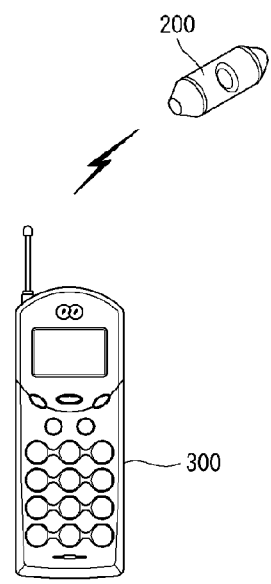
FIGS. 19 and 20 illustrate another structure of a mobile communication terminal according to the present invention.
Figure 20:
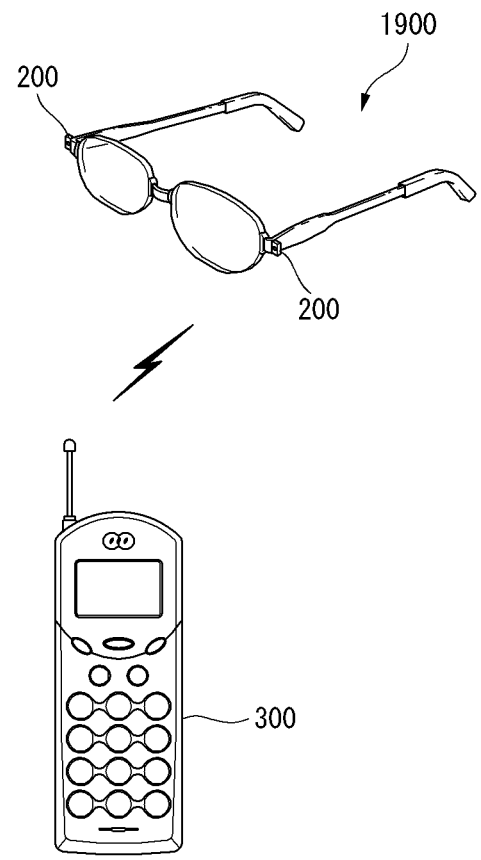

FIGS. 19 and 20 illustrate another structure of a mobile communication terminal according to the present invention. In what follows, the descriptions provided in detail above will be omitted. In this document, embodiments of the present invention are described with reference to the structure of a mobile phone from among mobile communication terminals; however, those descriptions related to FIGS. 19 and 20 are not limited only to mobile phones but can also be applied the same for such kind of mobile communication terminal as a navigation terminal.

With reference to FIG. 19, a mobile communication terminal 300 according to the present invention comprises a function unit 300 and a camera 200, where the camera 200 and the function unit 300 can be implemented as separate modules. Detailed descriptions of the function module 300 have been provided with reference to FIG. 3.

The camera 200 and the function unit 300 can communicate with each other through a wireless communication method. More specifically, though not shown in the figure, it may be regarded that a controller of the function unit 300 and a camera communicate with each other through a wireless communication method. Accordingly, the controller controlling the camera 200 controls the camera 200 through a wireless communication method.

To this purpose, though not shown in the figure, a communication unit intended for wireless communication can be installed additionally at each of the camera 200 and the function unit 300.

It is preferred for the camera 200 and the function unit 300 to communicate with each other through a wireless communication sold under the trademark BLUETOOTH® among wireless communication methods. In the case of a mobile communication terminal according to the present invention, a wireless communication sold under the trademark BLUETOOTH® is preferred for a wireless communication method between the camera 200 and the function unit 300; however, a different wireless communication method such as an infrared communication method can also be employed.

In this way, if the camera 200 and the function unit 300 communicate with each other through a wireless communication method, an installation position of the camera 200 can be selected with more freedom.

For example, as shown in FIG. 20, it is possible to install the camera 200 at the glasses worn by the user. In this case, since the camera 200 can take an image or a video along a viewing direction of the user, a more useful image or video can be obtained at the time of emergency mode.

Similarly, though not shown in the figure, it is possible to implement the camera 200 in the form of a necklace. In this case, the user can wear the camera 200 more conveniently.

Moreover, if the camera 200 and the function unit 300 communicate with each other through a wireless communication method, installation of the camera 200 at an object such as a hat, a bag, and the like can be done more easily. Accordingly, a more useful image or video can be obtained.

FIGS. 21 to 24 illustrate a power supply in more detail.

In what follows, detailed descriptions given above will be omitted.

Figure 21:
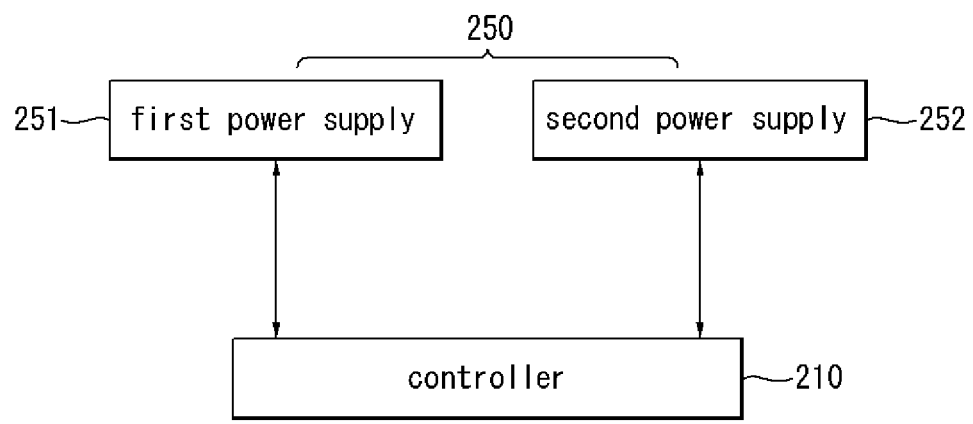
FIGS. 21 to 24 illustrate a power supply in more detail.

With reference to FIG. 21, the power supply 250 providing power required for operating a mobile communication terminal can comprise a first power supply 251 and a second power supply 252.

The first power supply 251 can provide power required for operating the mobile communication terminal at the time of normal and emergency mode according to the control of the controller 210.

In case the first power source 251 is used up and turned off, the second power supply 252 can be turned on according to the control of the controller 210 at the time of emergency mode and provide power required for operating the mobile communication terminal.

Figure 22:
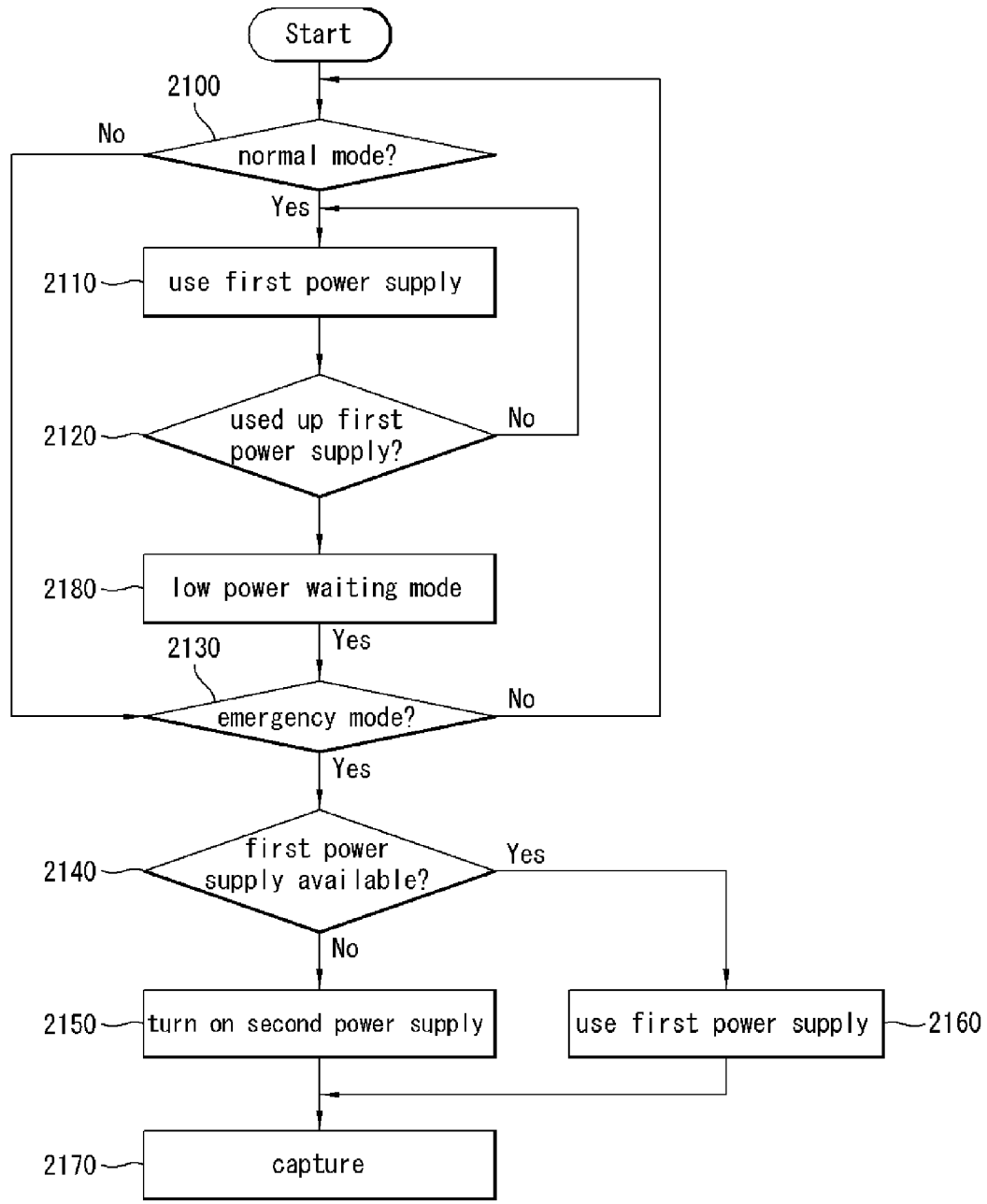

FIG. 22 illustrates operating the power supply 250 having the structure described above.

With reference to FIG. 22, first it is determined whether a current status of a mobile communication terminal is a normal mode 2100.

As a result of determination, in case the current status corresponds to normal mode, the first power supply 251 can be used as a primary power source. If the current status is not normal mode as a result of determination, it is determined whether the current status corresponds to an emergency mode 2130.

Afterwards, it is determined whether the first power supply 251 has been used up and turned off 2120. As a result, in case the first power supply 251 is used up, the mobile communication terminal can be set to a low power waiting mode 2180.

Here, the low power waiting mode may represent a situation where power consumption is actually minimized by cutting off voice communication and data transmission and reception in the case of normal mode. However, in the low power waiting mode, a minimal power can be used for determining whether emergency mode has been activated.

In the low power waiting mode, it is determined whether emergency mode is activated 2130; in the case of emergency mode, it is determined whether the first power supply 251 is available 2140. In case the first power supply 251 is unavailable, the second power supply 252 can be turned on 2150.

Afterwards, power is supplied from the second power supply 252 in the low power waiting mode and accordingly, the camera is enabled to capture an image or a video.

As described above, in the normal mode, the second power supply 252 is not required and the first power supply 251 provides power required for operating the mobile communication terminal.

Also, while the first power supply 251 is turned on, image or video capture is carried out by using the first power supply 251 even if emergency mode is activated; in case the first power supply 215 is used up, the mobile communication terminal can wait for the emergency mode is activated while in the low power waiting mode where power consumption is minimized.

In the meantime, in case the emergency mode is activated while in the low power waiting mode, the second power supply 252 not required for the normal mode is turned on and provides power required for operating the mobile communication terminal during the emergency mode. In other words, while an auxiliary power supply is maintained in preparation for the emergency mode during a predetermined period of time after a main power supply is used up, the auxiliary power supply is employed if the emergency mode is activated.

As described above, since the second power supply 252 is intended to be used as an emergency power supply in preparation for a case where the first power supply 251 is used up, it is preferable that the capacity of the second power supply 252 is smaller than that of the first power supply 251.

Figure 23:
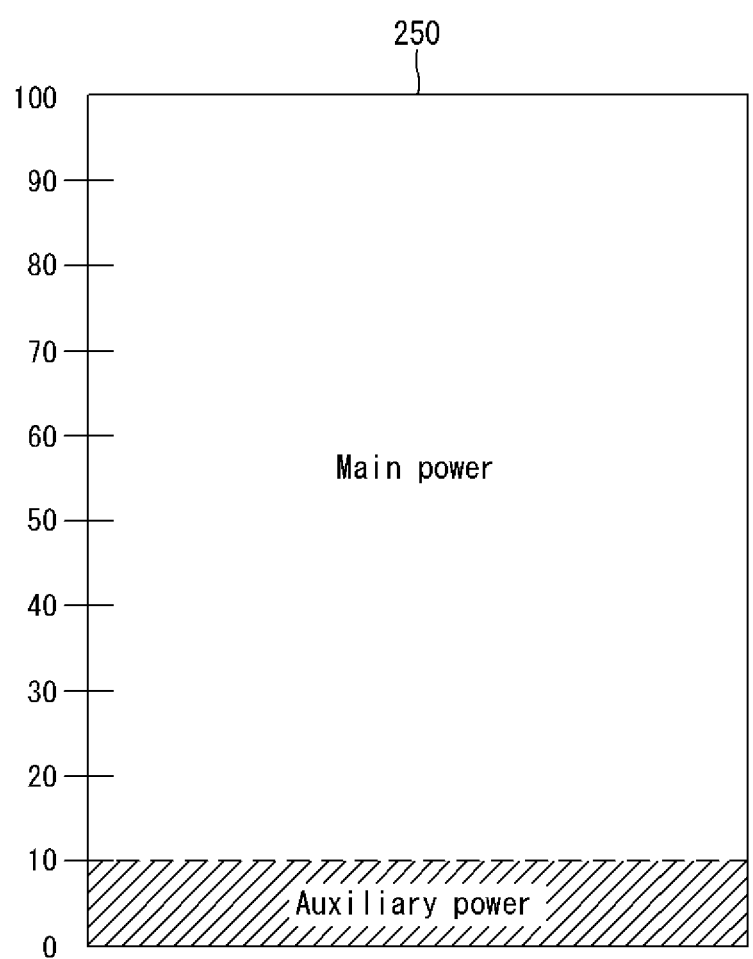

Next, as shown in FIG. 23, instead of employing a separate power supply in preparation for emergency mode, a single power supply may store an amount of power in preparation for emergency mode by using a single power supply.

For example, as shown in FIG. 23, a single power supply 250 can be divided into a main power source used for operation in the normal mode and emergency mode and an auxiliary power source used for emergency mode in case the main power source is used up. Moreover, the main power source can be set up to occupy approximately 90% of the whole capacity of the power supply 250 while the auxiliary power source is set up to occupy approximately 10% thereof.

Figure 24:
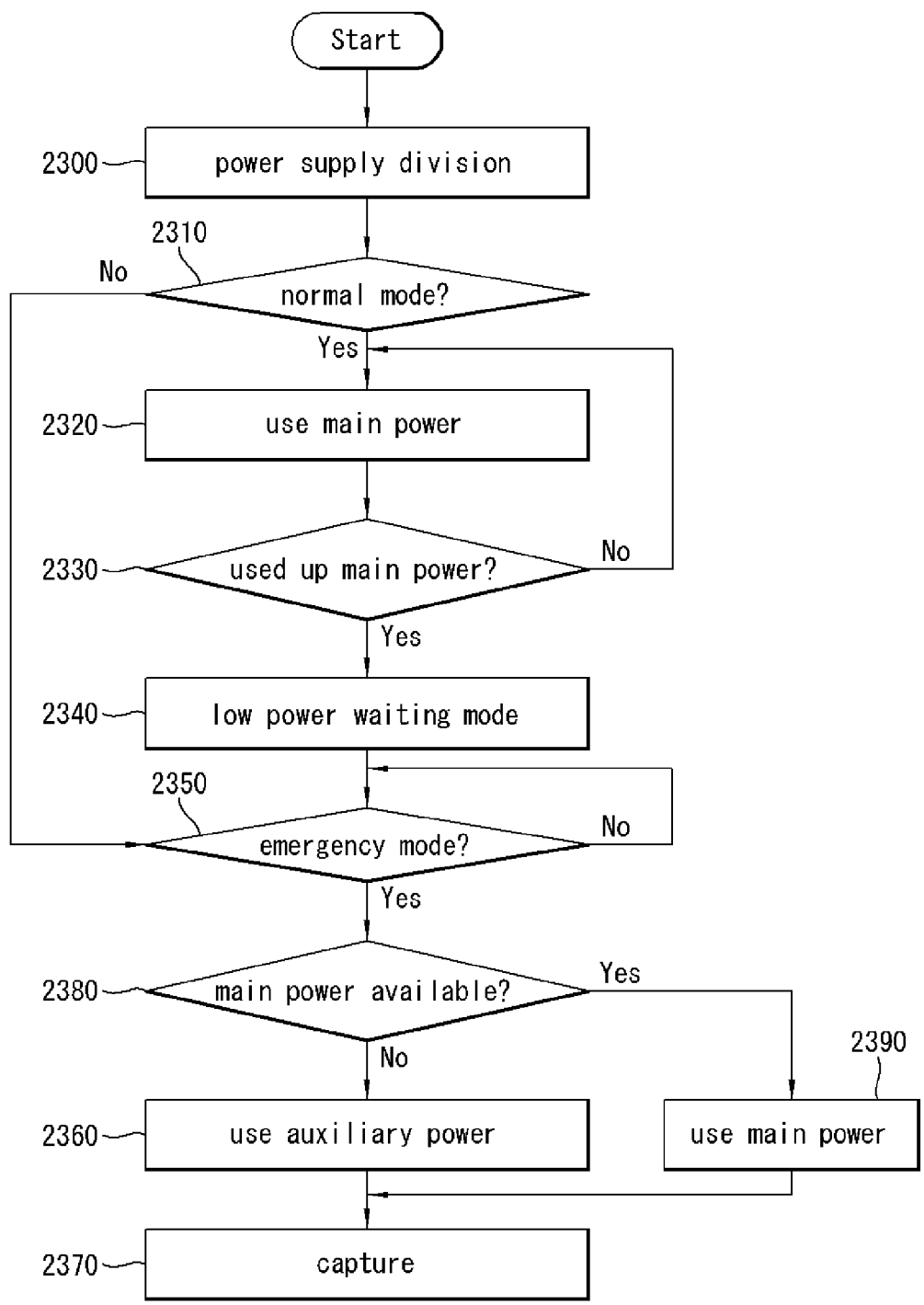

FIG. 24 illustrates operation of the power supply 250 constructed as described above. In what follows, detailed descriptions already provided in FIG. 22 will be omitted.

With reference to FIG. 24, compared with the case of FIG. 22, further comprised is a step of dividing the power supply 250 into a main power supply and an auxiliary power supply 2300.

It is possible to provide power in the same way as the method shown in FIG. 22 after the power supply 250 is divided into a main power source and an auxiliary power source. In the example of FIG. 22, the first power supply 251 may corresponding to the main power source while the second power supply 252 to the auxiliary power source.

FIGS. 25 to 36 illustrate a system and method for safety service using a mobile communication terminal according to the present invention. In what follows, detailed descriptions already provided will be omitted. For example, a mobile communication terminal described below may actually be the same as the terminal described in FIGS. 1 to 24 and therefore, detailed description of a terminal will be omitted afterwards.

Figure 25:
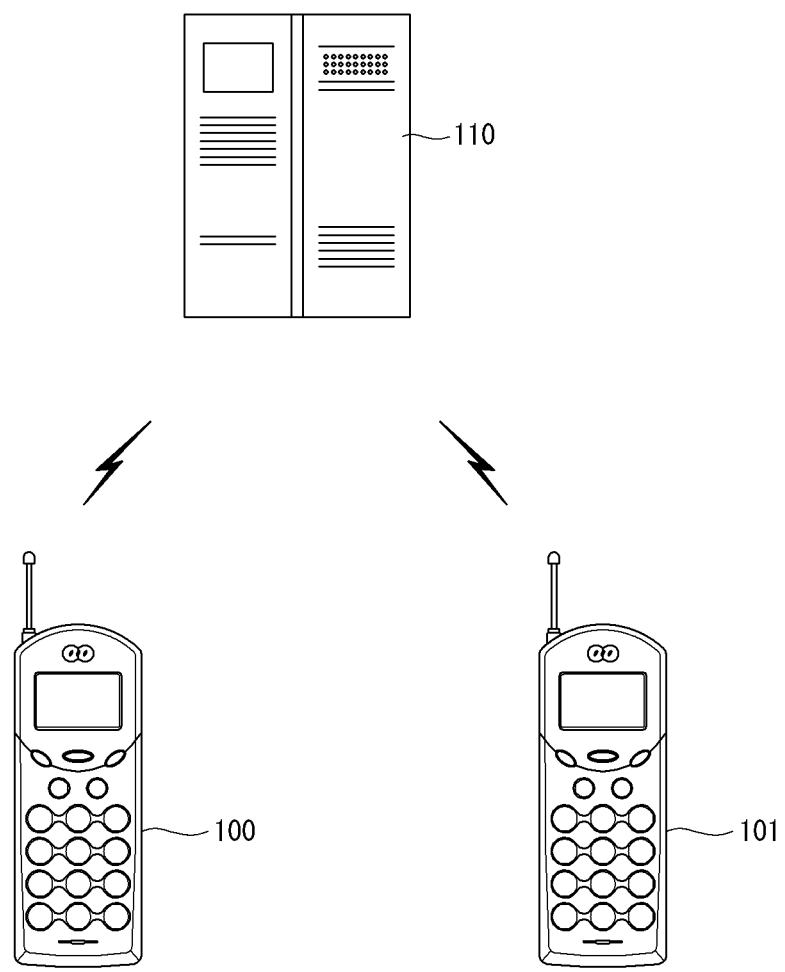
FIGS. 25 to 36 illustrate a system and method for safety service using a mobile communication terminal according to the present invention.

With reference to FIG. 25, a safety service system according to the present invention comprises a server 110, a first terminal 100, and a second terminal 101. Here, for the convenience of description, it is assumed that a single server 110 manages two terminals 100, 101 but the number of terminals 100, 101 managed by a single server 110 is not limited to the example.

For the convenience of description, suppose a first terminal 100 is a terminal 100 for a ward while the second terminal 101 is a terminal 101 for a guardian. It is also possible that the first terminal 100 is used for a terminal for a guardian while the second terminal 101 is used for a terminal for a ward.

Under an assumption that the first terminal 100 is used for a terminal for a ward 100 while the second terminal 101 is used for a guardian 101, the first terminal 101 can include a camera capable of capturing an image or video of the surroundings at the time of emergency mode; the second terminal 101 can include a camera but is not required to have a camera.

Also, the second terminal, namely, the terminal for a guardian can force the terminal for a ward 100 to be set to emergency mode by transmitting an emergency mode set-up command to the first terminal, namely, the terminal for a guardian 100.

The case above is useful for such a situation where it is necessary to set the terminal for a ward 100 to emergency mode even though the terminal for a ward 100 is not set to emergency mode since the terminal for a ward 100 does not satisfy the conditions for emergency mode. For example, when a child possessing the terminal for a ward 100 is not reached even though the terminal for a ward 100 is not set to emergency mode, parents possessing the terminal for a guardian 101 can force the terminal for a ward 100 for their child to be set to the emergency mode.

In case the terminal for a ward 100 is set to emergency mode through a method described in detail above, the terminal for a ward 100 can take an image or a video of the surroundings by using a camera.

Moreover, the data captured by the terminal for a ward 100 can be delivered to the terminal for a guardian 101 through a server 110 or delivered directly to the terminal for a guardian 101. In what follows, for the convenience of description, it is assumed that the terminal for a ward 100 and the terminal for a guardian 101 communicate with each other through the server 100.

The server 110 can provide location information for the terminal for a ward 100 and the terminal for a guardian 101. For example, the server 110 can provide location information based on GPS to the terminal for a ward 100 and the terminal for a guardian 101.

Also, the server 110 can transmit to the terminal for a guardian 101 the information that the terminal for a ward 100 has been set to emergency mode. Then the user of the terminal for a guardian 101 can check by using his or her mobile communication terminal that the terminal for a ward 100 has been set to emergency mode and also check the surroundings and detailed location of the user of the terminal for a ward 100 by checking the data captured by the terminal for a ward 100.

Also, the user of the terminal for a guardian 101 can check the location of the terminal for a ward 100 more accurately by comparing GPS-based location information of the terminal for a ward 100 provided by the server 110 with image or video data captured by the terminal for a ward 100.

Figure 26:
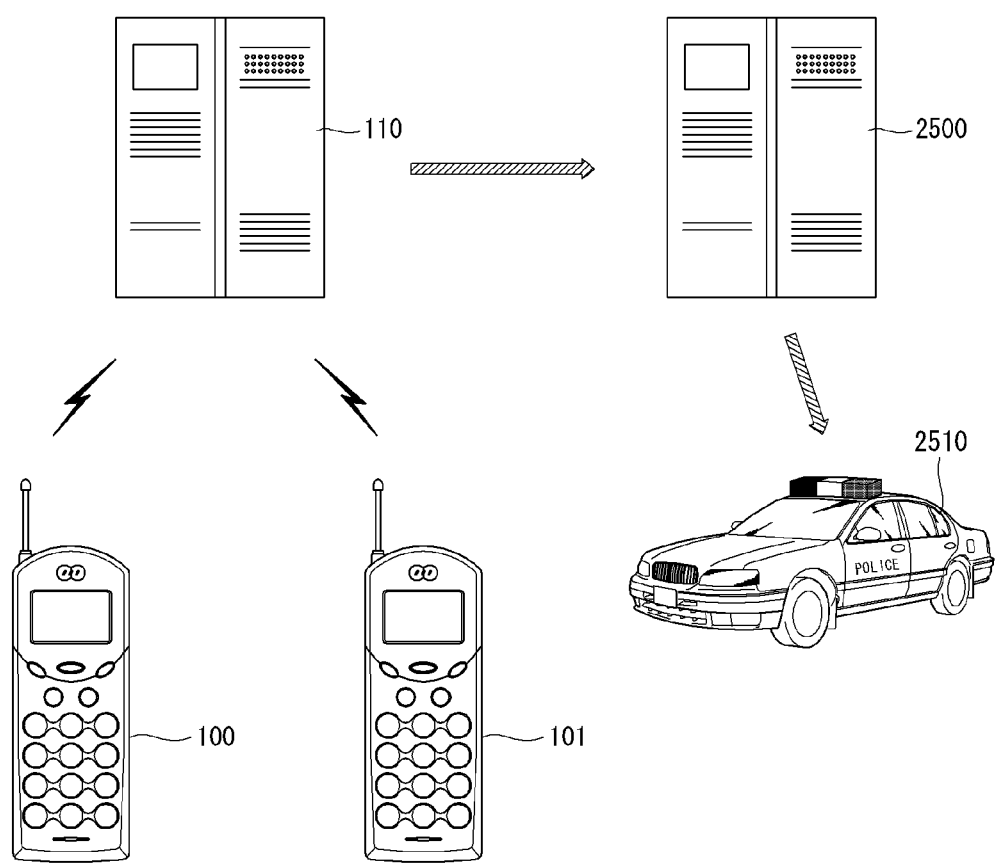

Also, as shown in FIG. 26, the server 110 can provide data captured by the terminal for a ward 101 set to emergency mode or location information of the terminal for a ward 101 to a first server 2500, for example, a police server. In this case, the police server 2500 can provide the location information and captured data of the terminal for a ward 101 to a patrol car 2510 on duty and based thereon, the patrol car 2510 can check detailed location of the terminal for a ward 100 and accordingly can find the user of the terminal for a ward 100 more quickly and safely.

In the above description, it was assumed that the server 110 provides the police server 250 data captured by the terminal for a ward 101 set to emergency mode and location information of the terminal for a ward 101; however, the server 110 can also provide the data captured by the terminal for a ward 101 set to emergency mode and location information of the terminal for a ward 101 to the police and other security service server.

Figure 27:
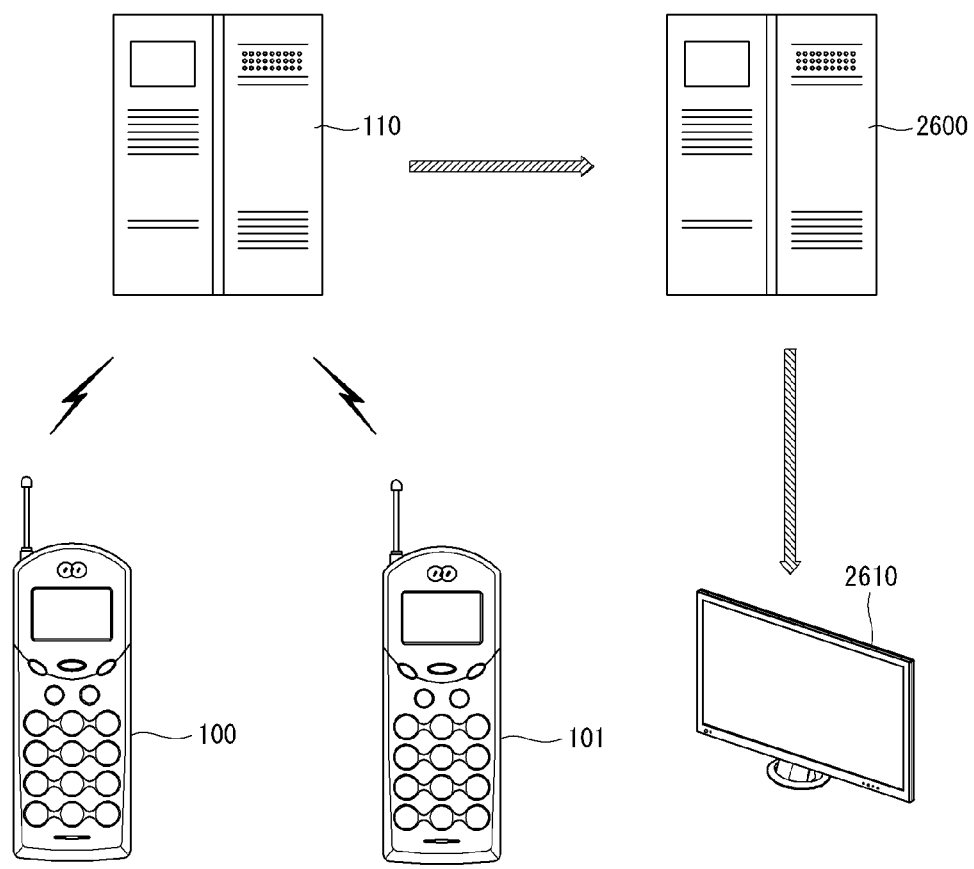

Also, as shown in FIG. 27, the server 110 can transmit the data captured by the terminal for a ward 101 set to emergency mode and the location information of the terminal for a ward 101 to a second server 2500. Here, the second server 2600 can correspond to a server 2600 for broadcasting business such as cable TV.

In this case, the server 2600 can display the data captured by the terminal for a ward 101 set to emergency mode or location information of the terminal for a ward 101 on a display means 2610 such as TV, monitor, and so on associated with the user of the terminal for a guardian 101. Then, while watching TV, the user of the terminal for a guardian 101 can easily check the information that the terminal for a ward 100 has been set to emergency mode and data captured by the terminal for a ward 101 set to emergency mode and location information of the terminal for a ward 101.

If the second server 2600 of FIG. 27 corresponds to a server for CCTV operation, the display means 2610 can be a CCTV screen.

As described above, by providing data captured by the terminal for a ward 101 set to emergency mode and location information of the terminal for a ward 101 to another server, safety of the user of the terminal for a ward 101 is secured easily and the user of the terminal for a ward 101 can be easily protected from a danger.

Meanwhile a system and method for safety service using a mobile communication terminal according to the present invention can compensate location information of the corresponding mobile communication terminal by using an image or a video captured by the mobile communication terminal set to emergency mode. In the following, the operation above is described.

It is preferable for a server 100 to include a predetermined image map in order to compensate location information of a mobile communication terminal by using an image or a video captured by the corresponding mobile communication terminal set to emergency mode.

The image map can be built by using images or videos captured by users, satellite pictures, three-dimensional drawings, and the like. For example, an image map of 'Gangnam station in Seoul' can be built by using images or videos of buildings, signs, road signs, bus stops, and the like around the 'Gangnam station', reminiscent of 'Gangnam station'.

Figure 28:
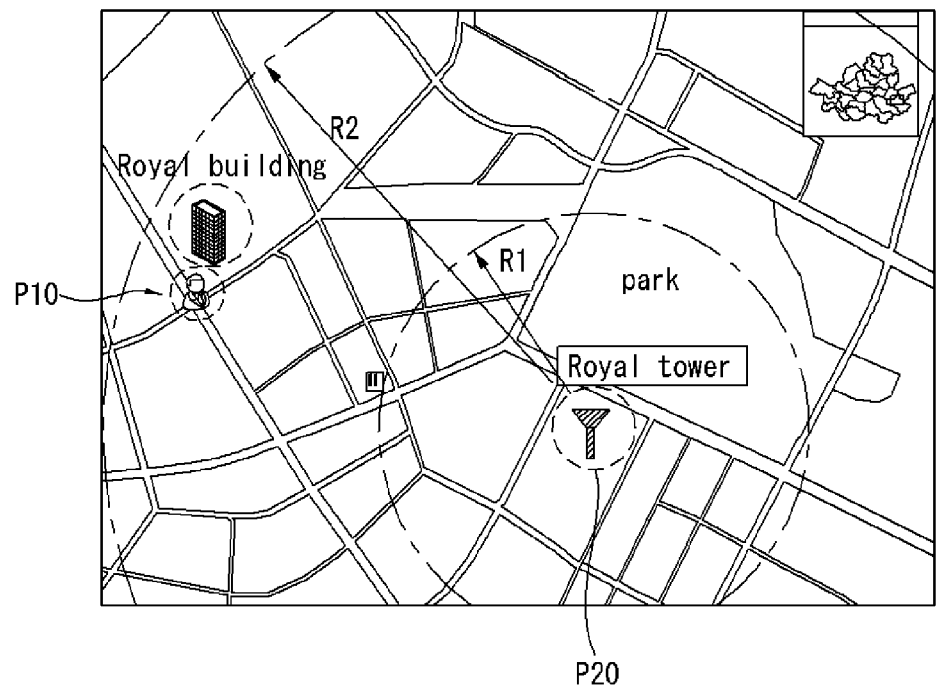

For example, as shown in FIG. 28, suppose 'Royal building' is located as a nearby landmark around a 10-th position P10 where a user with a mobile communication terminal is located and a 'Royal tower' is located around a 20-th position P20 separated by a predetermined distance from the 10-th position P10 as a landmark in that area.

As a method for obtaining a position of the user, a method for identifying an approximate position of the user by using base stations of communication service operators. However, such kind of positioning method may incur a relatively large position error. For example, as shown in FIG. 28, while the actual position of the user of the mobile communication terminal is around the 10-th position P10, an estimated position of the user identified through a method of using base stations by the server 110 may correspond to the 20-th position P20.

Figure 29:
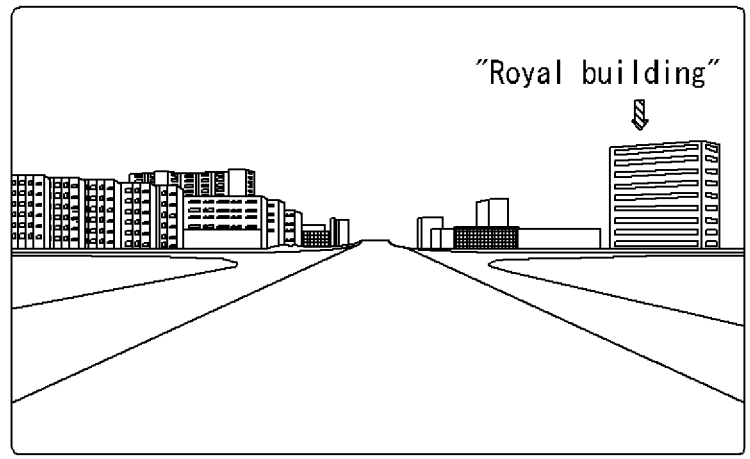
Figure 30:
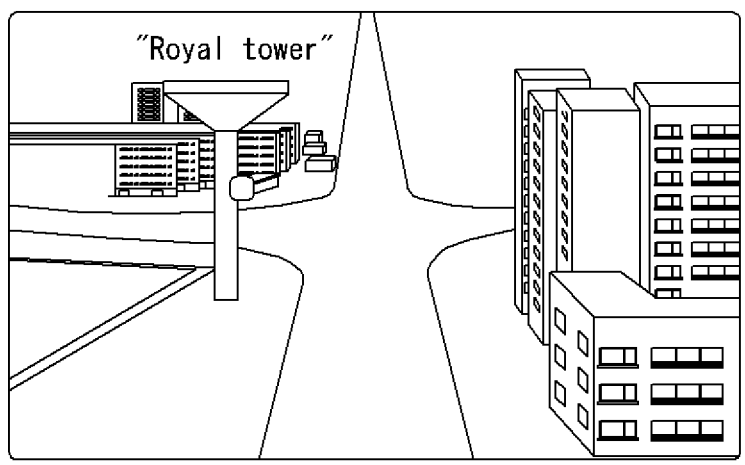

In this case, if the mobile communication terminal is set to emergency mode, the mobile communication terminal of the user can take a picture of the user's surroundings and transmit the picture to the server 110. Here, the picture transmitted to the server 110 by the mobile communication terminal of the user will look similar to what is shown in FIG. 29. In other words, since the position of the user is the 10-th position P10 around the 'Royal building', the picture captured by the mobile communication terminal of the user set to emergency mode may have a possibility of containing the image of the 'Royal building' which is a landmark of that area.

On the other hand, there may be a chance that the position of the user identified by the server 110, namely, the image map around the 20-th position P20 contains the image of the 'Royal tower' which is a landmark of the area containing the 20-th position.

In this case, the server 110 searches the image map for the 'Royal building' which is a landmark of the area containing the 10-th position P10 where the user is actually located, thereby obtaining more precise location information of the user.

Figure 31:
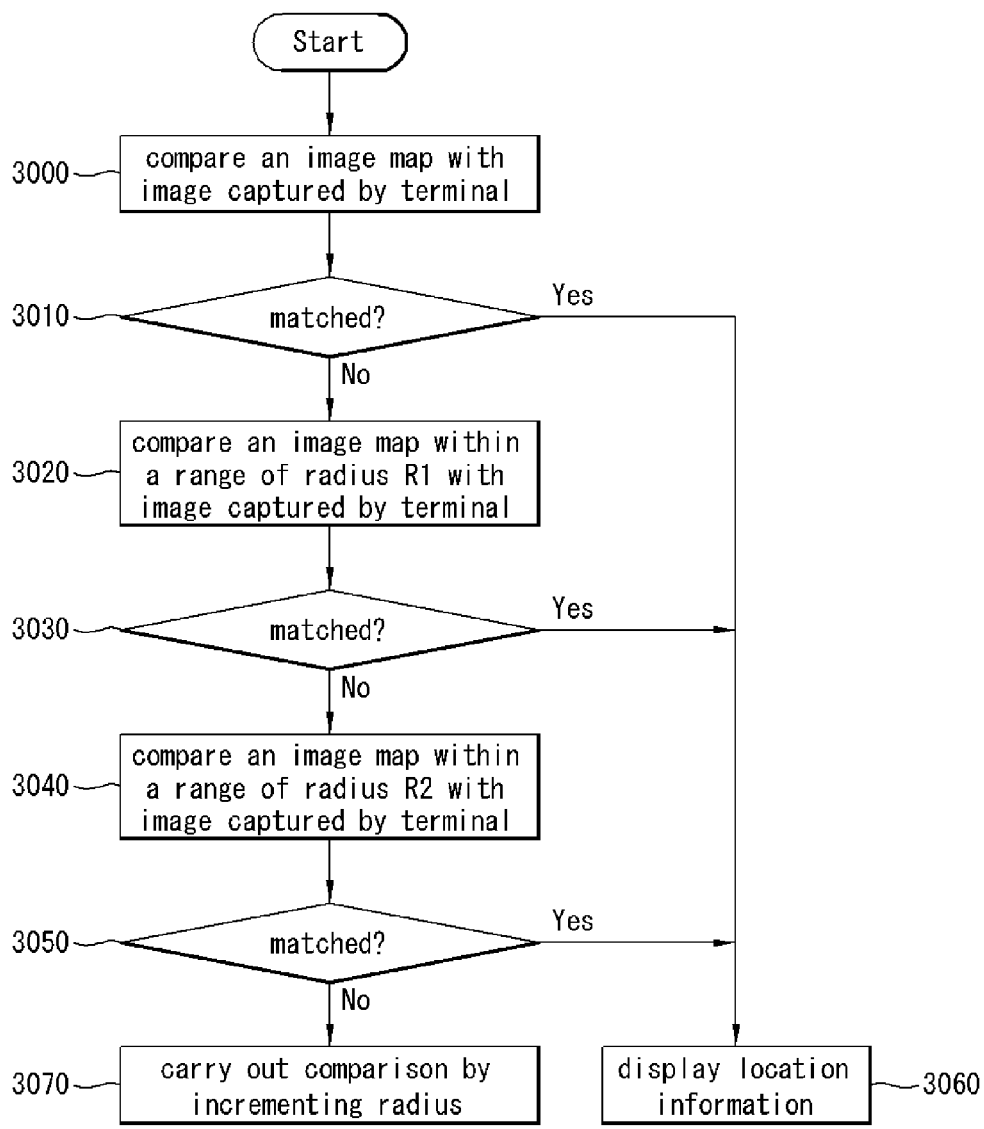

More specifically, as shown in FIG. 31, if an arbitrary mobile communication terminal set to emergency mode transmits a captured data to the server 110, the server 110 compares the captured data transmitted by the mobile communication terminal set to emergency mode with a previously stored image map 3000.

Next, the server 110 determines whether the pre-stored image map matches the captured data transmitted by the mobile communication terminal set to emergency mode 3010.

As a result of determination, in case the pre-stored image map matches the captured data transmitted by the mobile communication terminal set to emergency mode, the current location information of the user identified by the server 110 can be displayed 3060. The location information of the user displayed can be provided to another terminal or server.

On the other hand, as a result of determination, in case the pre-stored image map does not match the captured data transmitted by the mobile communication terminal set to emergency mode, it is determined again whether an image map containing the area within a radius R1 from the current location of the user identified by the server 110, namely, the 20-th position P20 matches the captured data transmitted by the mobile communication terminal set to emergency mode 3030.

As a result of determination, in case the image map containing the area within a radius R1 from the 20-th position P20 matches the captured data transmitted by the mobile communication terminal set to emergency mode, the server 110 determines the position around which a matched object is contained as the user's location and displays the determined position as the location information of the user 3060.

On the other hand, as a result of determination, in case the image map containing the area within a radius R1 from the 20-th position P20 does not match the captured data transmitted by the mobile communication terminal set to emergency mode, it can be determined again whether an image map containing the area within a radius R2 larger than R1 from the current location of the user identified by the server, namely, the 20-th position matches the captured data transmitted by the mobile communication terminal set to emergency mode 3050.

As a result of determination, in case the image map containing the area within a radius R2 from the 20-th position P20 matches the captured data transmitted by the mobile communication terminal set to emergency mode, the server 110 determines the position around which a matched object is contained as the user's location and displays the determined position as the location information of the user 3060. For example, as shown in FIG. 29, the server 110 searches the image map containing the area within a radius R2 from the 20-th position P20 for the 'Royal building' contained in the captured data transmitted by the user's mobile communication terminal and determines the position at which the 'Royal building' is located as the location of the user.

In this case, although the initial location of the user identified by the server 110 was the 20-th position P20, the location of the user compensated by using the captured data transmitted by the user's mobile communication terminal and the image map can be a position adjacent to the 'Royal building' which is close to the actual location of the user.

In this way, a matching task can be carried out by incrementing the search radius from the 20-th position P20.

Meanwhile, in case the pre-stored image map does not match the captured data transmitted by the mobile communication terminal set to emergency mode, the angle-of-view of the camera of the mobile communication terminal set to emergency mode can be changed. A detailed description of a method for changing angle-of-view of the camera is given previously above.

Figure 32:
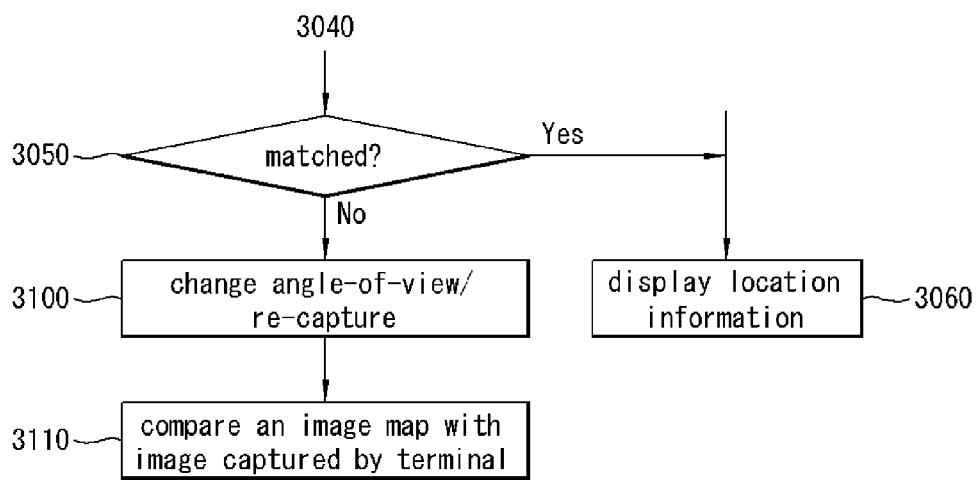

For example, as shown in FIG. 32, if it is found that the image map containing the area within a radius R2 from the 20-th position P20 does not match the captured data transmitted by the mobile communication terminal set to emergency mode 3050, the angle-of-view of the camera of the mobile communication terminal can be changed and a new image can be captured.

In this case, it is possible for the server 110 to change angle-of-view by transmitting a camera's angle-of-view change command to the corresponding mobile communication terminal. Similarly, if the server 110 transmits the information indicating that the image map within a radius R2 from the 20-th position P20 does not match the captured data transmitted by the mobile communication terminal set to emergency mode, the corresponding mobile communication terminal can change the angle-of-view of the camera based on the information transmitted.

In the above, described is a case where an image map within a predetermined radius from an arbitrary position is compared with the data captured by the mobile communication terminal and angle-of-view of the camera is changed accordingly; however, camera's angle-of-view can be changed independently of the method of comparing an image map with the data captured by the mobile communication terminal as the search radius is incremented. For example, as shown in the step 3020 of FIG. 31, it is possible to recapture an image after changing the camera's angle-of-view without changing the radius within the image map and compare the recaptured image with the image map.

For example, since there may be a chance that although the user is actually located at the 20-th position P20, the 'Royal tower', which is a landmark in the area around the 20-th position P20, may not be contained in the image or video captured by the corresponding mobile communication terminal; therefore, it may be more effective to take a picture again after changing the angle-of-view of the camera.

In what follows, a yet another method for compensating location information will be described.

The user's location can be compensated by using the user's position determined by the server 110 according as time passes and a time difference.

More specifically, in case the difference between location information of the mobile communication terminal obtained at a first time point and location information of the mobile communication terminal obtained at a second time point exceeds a predetermined critical range, the server 110 can compensate the location of the corresponding mobile communication terminal by comparing a pre-stored image map and the data captured by the corresponding mobile communication terminal.

A method for compensating the position of the corresponding mobile communication terminal is described in detail with reference to FIGS. 28 to 32. To this purpose, a method of recapturing an image by changing camera's angle-of-view and a method of matching by incrementing a radius within an image map can be applied.

Figure 33:
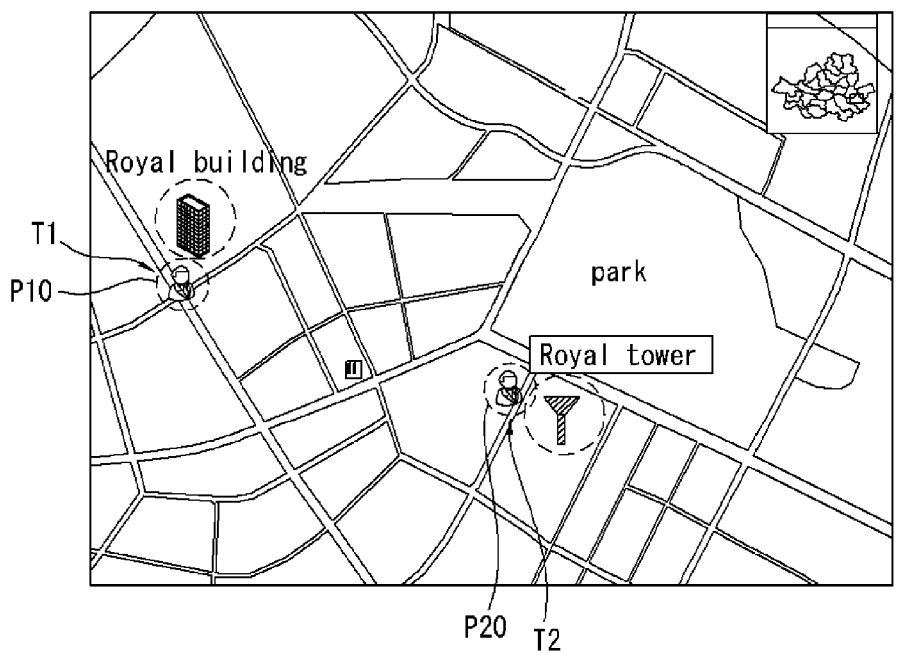

For example, as shown in FIG. 33, suppose the position of the mobile communication terminal obtained at a first time point T1 by the server 110 is the 10-th position P10 and the position of the mobile communication terminal obtained at a second time point T2 after a predetermined time period since the first time point T1 is the 20-th position P20.

Here, if a time difference between the first T1 and the second time point T2 is approximately 10 seconds and the actual distance between the 10-thh position P10 and the 20-th position P20 is approximately 10 km, the position of the user determined by the server 110 can be regarded to be wrong. It is because a human can hardly travel 10 km of distance within 10 seconds. In this case, the user's location can be compensated by re-applying the matching task by changing the angle-of-view of the camera or incrementing the search radius within the image map.

To use the method above, a critical value which can be changed according to time can be set up beforehand. For example, setting the critical value of a distance for which the user can travel within one minute approximately as 2 km, if a time difference between the first T1 and the second time point T2 is approximately one minute and the actual distance between the 10-th position P10 and the 20-th position P20 is shorter than 2 km, the server 110 determines that the confidence level of the user's location is high and transmits the location information of the user to another mobile communication terminal or another server. In case the actual distance between the 10-th position P10 and the 20-th position P20 is longer than 2 km, the server 110 can compensate the location of the user.

Figure 34:
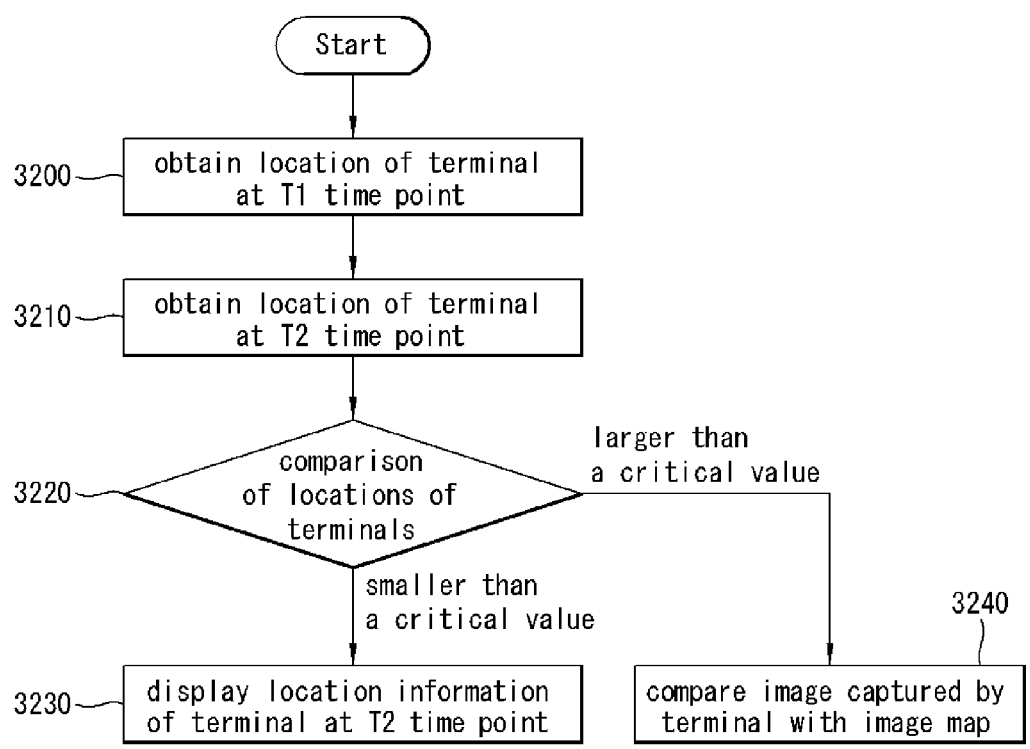

More specifically, as shown in FIG. 34, the server 110 can obtain the user's location measured at the first time point T1 and the user's location measured at the second time point T2.

Afterwards, comparing the locations of the mobile communication terminal at the first T1 and the second time point T2 3220, if the distance between the locations of the mobile communication terminal at the first T1 and the second time point T2 is smaller than a critical value, the server 110 can display the position of the mobile communication terminal at the second time point T2 as the current location information of the user 3230.

On the other hand, comparing the locations of the mobile communication terminal at the first T1 and the second time point T2 3220, if the distance between the locations of the mobile communication terminal at the first T1 and the second time point T2 is larger than a critical value, the server 110 decides that the position of the mobile communication terminal at the second time point T2 is inaccurate and can carry out camera capture again by changing the camera's angle-of-view or carry out the task of comparing/matching an image map containing the area within a predetermined radius from the position of the mobile communication terminal at the second time point T2 with the data captured by the mobile communication terminal set to emergency mode.

Similarly, in case the terminal for a ward 100 is set to emergency mode, the terminal for a guardian 101 can transmit a re-capture command to the terminal for a ward 100.

Figure 35:
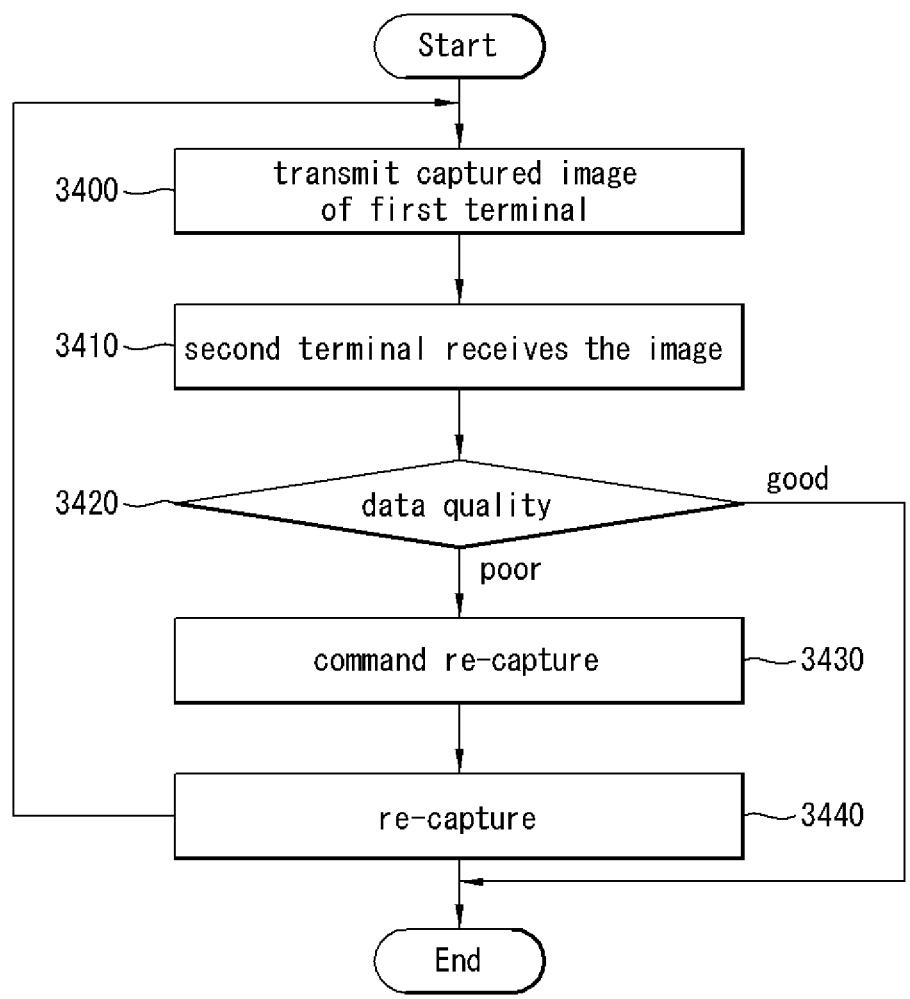

For example, as shown in FIG. 35, the data captured by a first terminal set to emergency mode, namely the terminal for a ward 100 is transmitted 3400, a second terminal, namely the terminal for a guardian 101 can receive the data 3410.

Afterwards, the terminal for a guardian 101 determines whether the received captured data is in good quality 3420; in case the received captured data is in poor quality, the terminal for a guardian 101 can transmit a re-capture command to the terminal for a ward 100. Then the terminal for a ward 100 can transmit the re-captured data.

For example, in case an image or video captured by the terminal for a ward 100 is blurred or it is difficult to identify the position of the terminal for a ward 100 from the captured data, the guardian can transmit a re-capture command to the terminal for a ward 100 by using the terminal for a guardian 101.

Figure 36:
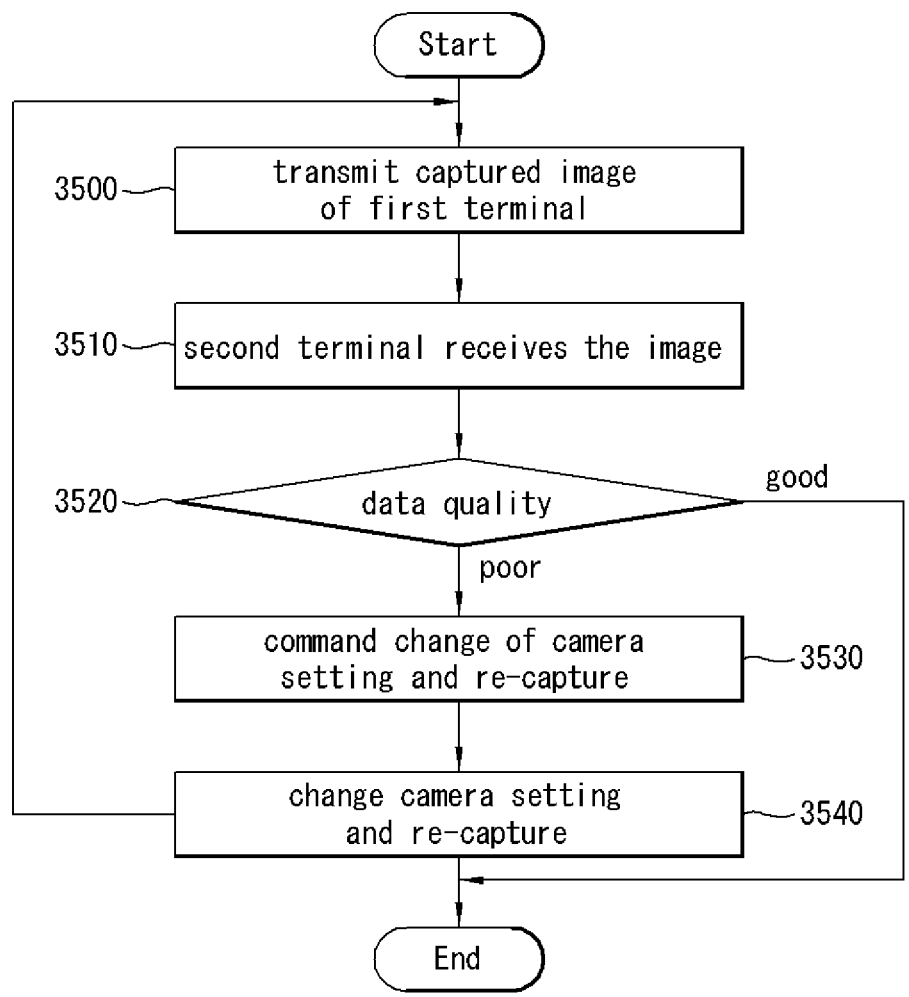

Similarly, as shown in FIG. 36, in case it is determined that captured data received by the terminal for a guardian 101 is in poor quality 3520, the terminal for a guardian 101 can transmit to the terminal for a ward 100 a re-capture command and a camera setting change command 3530.

In this case, the terminal for a ward 100 can transmit data captured again after changing various settings of the camera required for an image or video capture task such as angle-of-view change, on/off setting of flash, resolution change, and the like.

Descriptions of FIG. 36 also found in FIG. 35 will be omitted.

FIGS. 37 to 41 illustrate another method for changing angle-of-view in detail. In what follows, detailed descriptions already provided above will not be repeated.

The present invention enables to change angle-of-view of a camera in various directions.

Figure 37:
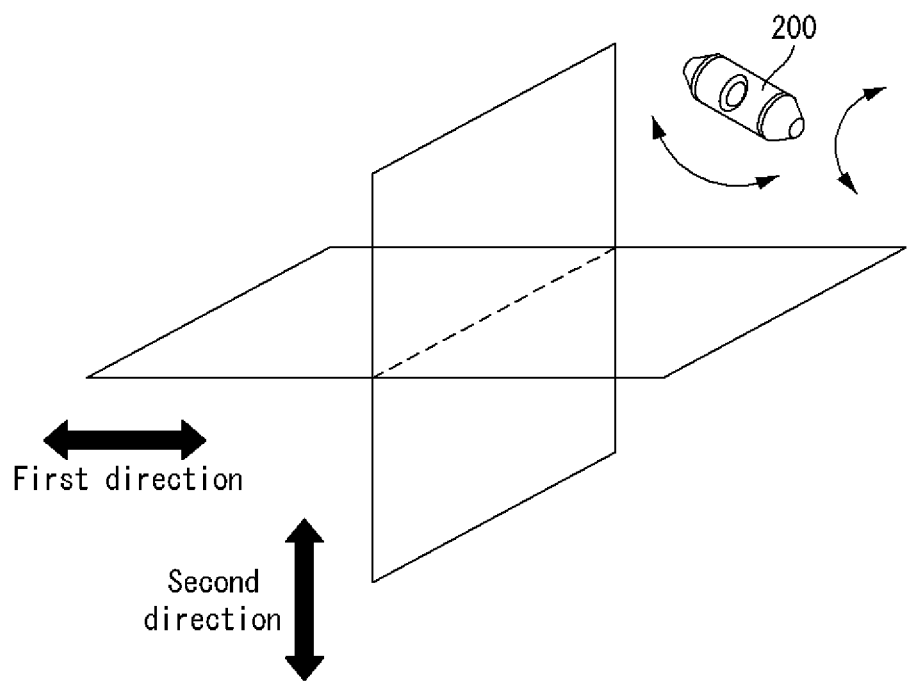
FIGS. 37 to 41 illustrate another method for changing angle-of-view in detail.
Figure 38:
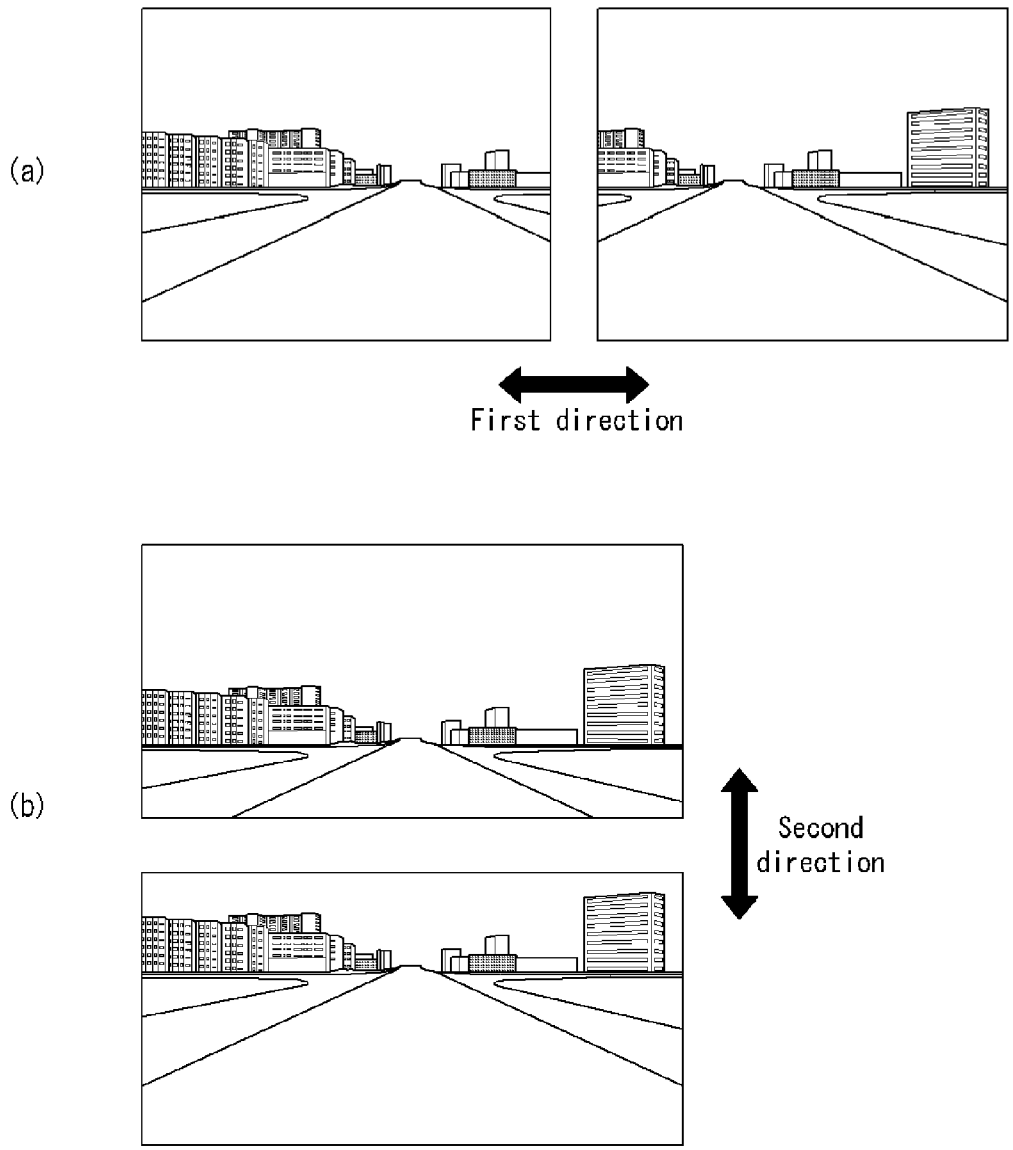

For example, as shown in FIG. 37, it is possible to change the angle-of-view of the camera 200 along a first and a second direction. Here, a method of changing angle-of-view of a camera has been already described in detail above; therefore, repeated descriptions will be omitted.

The first direction may correspond to a horizontal direction with respect to the camera 200 while the second direction may correspond to a vertical direction with respect to the camera 200.

Here, in the case of emergency mode, it is possible that the camera 200 first captures an image or a video while changing angle-of-view along the horizontal direction (first direction) and then captures an image or a video by changing the angle-of-view along the vertical direction (second direction). In this way, an image or a video for a larger area can be captured.

For example, as shown in FIG. 38(a), if an image or a video is captured by changing the angle-of-view of the camera 200 along the horizontal direction, an image or a video for a larger area along the horizontal direction can be obtained. In the same manner, as shown in FIG. 38(b), if an image or a video is captured by changing the angle-of-view of the camera 200 along the vertical direction, an image or a video for a larger area along the vertical direction can be obtained.

Figure 39:
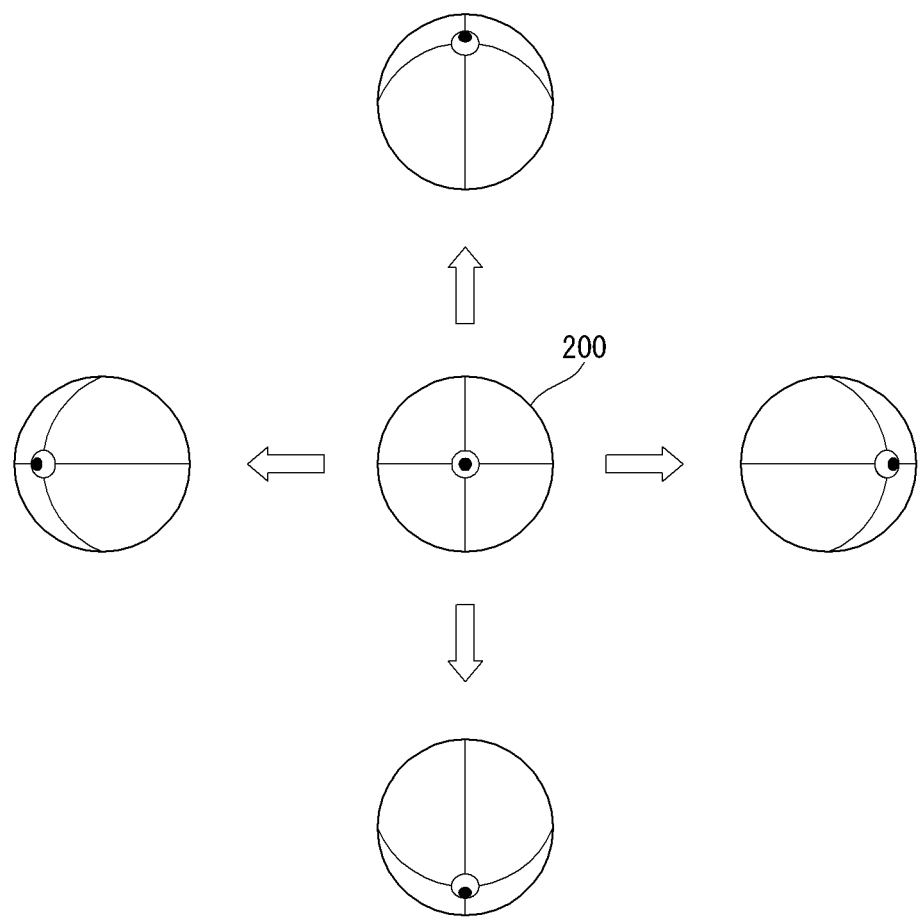

As described above, to change the angle-of-view of the camera 200 in a vertical and horizontal direction, the line of sight of the camera 200 can be change along up, down, left, and right direction, which is illustrated in FIG. 39.

In this case, the angle-of-view of the camera 200 can be changed by inclining the axis of the camera 200.

Figure 40:
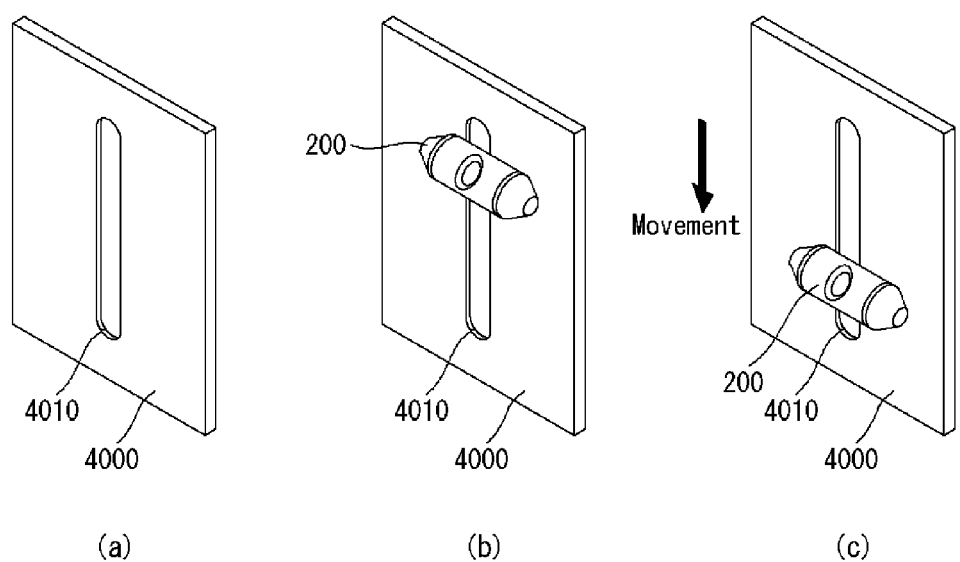

Likewise, as shown in FIG. 40, it is possible to capture an image or a video while changing the position of the camera 200.

To this purpose, a mobile communication terminal according to the present invention, as shown in FIG. 40(a) can comprise a position moving unit 4000 for moving the position of the camera 200. A guiding groove 4010 can be formed in the position moving unit 4000 for guiding the camera 200.

In this case, as shown in FIG. 40(*b*), the camera 200 can capture an image or a video while moving along the groove 4010 of the moving unit 4000.

For example, as shown in FIG. 40(*b*), the camera 200 can take an image after moving to an upper part of the groove 4010 of the moving unit 4000 and then the camera 200 can take an image after moving to a lower part of the groove 4010 of the moving unit 4000 as shown in FIG. 40(*c*). In this case, the camera 200 can take an image or a video for a larger area along a vertical direction.

Different from FIG. 40, the groove of the moving unit 4000 can be formed along a horizontal direction.

Figure 41:
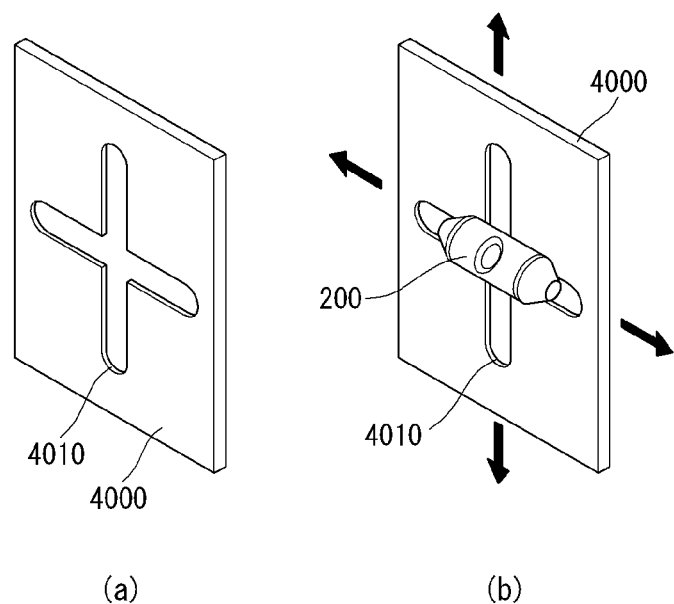

Similarly, as shown in FIG. 41(*a*), the moving unit 4100 can be formed to have a groove for moving the camera 200 along a vertical and a horizontal direction.

In this case, as shown in FIG. 41(*b*), the camera 200 can move in a vertical and horizontal direction along the groove 4110 of the moving unit 4100.

Figure 42:
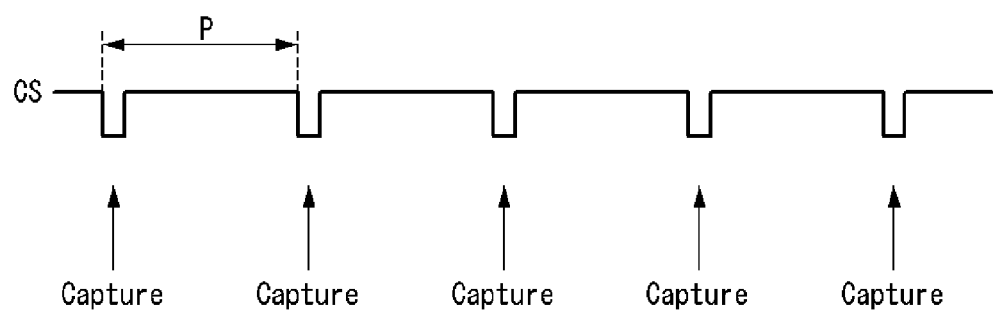
FIG. 42 illustrates a method for capturing images periodically.

FIG. 42 illustrates a method for capturing an image in a periodic manner. In what follows, detailed descriptions given above will not be repeated.

In the description above, although the camera is used to capture an image or a video of the surroundings in the case of emergency mode and the captured image or video is transmitted, the camera is capable of capturing and transmitting an image or a video at predetermined intervals.

For example, as shown in FIG. 42, the camera can capture and transmit an image or a video at predetermined intervals according to a clock signal CS provided according to predetermined intervals.

FIG. 42 illustrates a case where the camera is not limited to emergency mode but captures an image or a video in a normal mode at predetermined intervals P, where a capture and transmission method for the normal mode can be actually the same as the method employed for emergency mode.

In the case of FIG. 42, the captured data can be used as the data for monitoring a movement path of the user in his or her everyday living.

Meanwhile, the mobile communication terminal according to the present invention can implement a game function. In what follows, a description thereof will be provided.

For the convenience of description, it is assumed that a terminal A and a terminal B carry out a game function.

The user of the terminal A can carry out a game of guessing or estimating the position of the terminal B.

To this purpose, a camera installed in the terminal B captures an image of the surroundings of the terminal B and transmits the captured image to the terminal A.

Here, it is possible for the user of the terminal A to send a capture command to the terminal B so that the terminal B take an image of its surroundings. This situation corresponds to the case where the user of the terminal A plays the game.

On the other hand, it is also possible that the user of the terminal B captures an image of its surroundings to allow the user of the terminal A to guess or estimate the position of the terminal B. This situation corresponds to the case where the user of the terminal B plays the game.

Meanwhile, if image data of the surroundings of the terminal B captured by the camera installed in the terminal B is transmitted to the terminal A, the user of the terminal A can select the position of the terminal B.

For example, the user of the terminal A checks the image data transmitted from the terminal B and based on the checked image data, can come to a conclusion that the position of the terminal B is 'at the front of the 7-th exit of Gangnam station' and the user of the terminal A can input an answer stating that the position of the terminal B is 'at the front of the 7-th exit of Gangnam station'.

In case the position of the terminal B is 'at the front of the 7-th exit of Gangnam station', it corresponds to the case that the user of the terminal A has provided a right answer and predetermined points are added to the terminal A.

On the other hand, in case the position of the terminal B is 'at the front of the 1st exit of Gangnam station', it corresponds to the case that the user of the terminal A has failed to provide a right answer and predetermined points are taken away from the terminal A.

The game can be played differently from the above.

For example, if the image data of the surroundings of the terminal B captured by the camera installed in the terminal B is transmitted to the terminal A, the user of the terminal A can select the position of the terminal B in the form of a predetermined range.

For example, the user of the terminal A checks the image data transmitted from the terminal B and based on the checked image data, can come to a conclusion that the position of the terminal B is 'around Gangnam station' and the user of the terminal A can input an answer stating that the position of the terminal B is 'within a radius of 100 m from Gangnam station'.

If the position of the terminal B is 'within a radius of 100 m from Gangnam station', it corresponds to the case that the user of the terminal A has provided a right answer and predetermined points are added to the terminal A.

On the other hand, if the position of the terminal B is 'at the front of Sinsa station', it corresponds to the case that the user of the terminal A has failed to provide a right answer and predetermined points are taken away from the terminal A.

Also, it is possible to adjust the points according to the radius of a position range of the terminal B.

For example, if the position of the terminal B is 'at the front of the 7-th exit of Gangnam station' and the user of the terminal A selects the position of the terminal B to be 'at the front of the 7-th exit of Gangnam station', 100 points can be assigned to the terminal A, whereas if the user of the terminal A selects the position of the terminal B to be 'within 50 m from the 7-th exit of Gangnam station', 50 points may be assigned to the terminal A. Similarly, if the user of the terminal A selects the position of the terminal B to be 'within 100 m from the 7-th exit of Gangnam station', 20 points may be assigned to the terminal A.

In this way, it is possible to increase additional points for the case where the position of the terminal B is identified more precisely.

As described above, the additional points can be used for reduction of service charges for the terminal A or can be used for providing an additional service for free.

Such kind of game function can be used to achieve an effect of inducing users to use mobile communication terminals according to the present invention more frequently.

Meanwhile, the terminal A and B can be the same with or different from each other.

Also, either of the terminal A and B can be the terminal for a guardian and the other the terminal for a ward.

Similarly, both the terminal A and B can be terminals for a guardian or the terminals for a ward.

As described above, it should be understood that the technical structure of the present invention described in detail above can be realized in other specific forms by those skilled in the art to which the present invention belongs without changing the technical principles or essential characteristics of the present invention.

Therefore, it should be understood that the embodiments described above are only exemplary embodiments in all respects and do not limit the technical scope of the present invention. The technical scope of the present invention should be defined by appended claims below rather than the aforementioned specific descriptions; also, it should be understood that the meaning and scope of the claims and every possible modification derived from the equivalent concept thereof or modified forms all belong to the scope of the present invention.

The invention claimed is:

1. A method for providing safety service by a server for a user, the method comprising:
   in case that a first terminal including a camera is set to emergency mode,
   receiving first image data of surroundings captured by the camera from the first terminal;
   transmitting the first image data and/or location information of the first terminal to a second terminal;
   determining whether the first image data matches at least one of a plurality of pre-stored image data; and
   if the first image data does not match the at least one of the plurality of pre-stored image data, transmitting a camera's angle-of-view change command to the first terminal; and
   if second image data is captured from the first terminal according to the camera's angle-of-view change command, receiving the second image data from the first terminal.

2. The method of claim 1, wherein the first terminal is a terminal for a ward and the second terminal is a terminal for a guardian.

3. The method of claim 1, wherein the first terminal is set to emergency mode by a set-up command transmitted from the second terminal to the first terminal.

4. The method of claim 1, further comprising:
   transmitting the first image data and/or the location information of the first terminal to at least one of a police server, a security service server and a broadcasting business server.

5. The method of claim 1, further comprising:
   compensating the location information of the first terminal by comparing the first image data with the plurality of pre-stored image data.

6. The method of claim 5, wherein in case the at least one of the plurality of pre-stored image data matches the first image data, the method further comprises:
   outputting current location information of the first terminal identified by the server.

7. The method of claim 5, wherein in case the at least one of the plurality of pre-stored image data does not match the first image data, the method further comprises:
   acquiring a position of the first terminal on the plurality of pre-stored image data that matches the first image data by comparing the first image data with the plurality of pre-stored image data containing an area within a preset radius from an estimated location of the first terminal; and
   acquiring the location information of the first terminal based on the acquired position.

8. The method of claim 5, wherein in case the at least one of the plurality of pre-stored image data does not match the first image data, the method further comprises:
   correcting the location information of the first terminal based on the second image data,
   wherein the camera's angle-of-view change command is a command for instructing to change the camera's angle-of-view of the first terminal.

9. The method of claim 5, wherein the compensating comprises:
   in case a difference between the location information of the first terminal obtained at a first time point and the location information of the first terminal obtained at a second time point exceeds a predetermined critical range, correcting the location information of the first terminal by comparing the plurality of pre-stored image data and the first image data.

10. The method of claim 1, wherein the first terminal is set to emergency mode when an event occurs,
    wherein the event comprises at least one of the user leaving a predetermined safety zone, the user entering a predetermined dangerous zone, the user leaving a trajectory on a predetermined route, the user inputting an emergency mode set-up command, and applying an impact larger than a predetermined critical value to the first terminal.

11. The method of claim 1, further comprising:
    determining whether the first image data is in good quality; and
    in case the first image data is in poor quality, transmitting a re-capture command to the first terminal.

12. The method of claim 1, further comprising:
    when a re-capture command is received from the second terminal, transmitting the re-capture command to the first terminal.

13. The method of claim 1, further comprising:
    when a camera setting change command is received from the second terminal, transmitting the camera setting change command to the first terminal.

14. A server for providing safety service, the server comprising:
    a communication unit, in case that a first terminal including a camera is set to emergency mode, receiving first image data of surroundings captured by the camera from the first terminal; and
    a control unit controlling the communication unit by transmitting the first image data and/or location information of the first terminal to a second terminal,
    wherein the control unit determines whether the first image data matches at least one of a plurality of pre-stored image data, and if the first image data does not match the at least one of the plurality of pre-stored image data, the control unit transmits a camera's angle-of-view change command to the first terminal, and if second image data is captured from the first terminal according to the camera's angle-of-view change command, the communication unit receives the second image data from the first terminal.

15. The server of claim 14, wherein the first terminal is a terminal for a ward and the second terminal is a terminal for a guardian.

16. The server of claim 14, wherein the first terminal is set to emergency mode by a set-up command transmitted from the second terminal to the first terminal.

17. The server of claim 14, further comprising:
    a compensating unit compensating the location information of the first terminal by comparing the first image data with the plurality of pre-stored image data.

18. The server of claim 14, wherein when a re-capture command is received from the second terminal, the control unit controls the communication unit to transmit the re-capture command to the first terminal.

19. A non-transitory computer readable storage medium containing instructions that, when executed by one or more processors, cause the one or more processors to perform the method of claim 1.

* * * * *